United States Patent [19]

Tsai et al.

[11] Patent Number: 5,357,008
[45] Date of Patent: Oct. 18, 1994

[54] LATENT CURING AGENT FOR EPOXY RESIN AND ITS PREPARATION

[75] Inventors: Hsi-Chuan Tsai, Kanagawa; Souichi Muroi, Shizuoka, both of Japan

[73] Assignee: W. R. Grace & Co.-Conn., New York, N.Y.

[21] Appl. No.: 4,376

[22] Filed: Jan. 14, 1993

[30] Foreign Application Priority Data

| Jan. 22, 1992 | [JP] | Japan | 009415 |
| Jan. 24, 1992 | [JP] | Japan | 011199 |
| Dec. 14, 1992 | [JP] | Japan | 333070 |
| Dec. 18, 1992 | [JP] | Japan | 338239 |

[51] Int. Cl.$^5$ .............................................. C08F 283/00
[52] U.S. Cl. ................................. 525/526; 525/504; 525/507; 528/88; 528/93; 528/111
[58] Field of Search ............... 525/526, 504, 507, 526; 528/89, 97, 88, 89, 93, 111

[56] References Cited

U.S. PATENT DOCUMENTS

| 3,860,541 | 1/1975 | Lehmann et al. | 525/523 |
| 3,993,707 | 4/1976 | Cummings | 525/526 |
| 4,022,946 | 5/1977 | Cummings | 428/413 |
| 4,101,459 | 7/1978 | Andrews | 528/90 |
| 4,446,257 | 5/1984 | Kooijmans et al. | 523/417 |
| 4,588,617 | 5/1986 | Oka | 523/414 |
| 4,732,961 | 3/1988 | Oka | 528/111 |
| 4,844,959 | 7/1989 | Read et al. | 525/524 |
| 4,894,403 | 6/1986 | Kempter et al. | 523/415 |
| 4,959,398 | 8/1990 | Oka et al. | 528/111 |

FOREIGN PATENT DOCUMENTS

| 56-65052 | 6/1981 | Japan . |
| 59-24762 | 2/1984 | Japan . |
| 62-265323 | 11/1987 | Japan . |

OTHER PUBLICATIONS

Journal of Applied Polymer Science, vol. 32, 5095–5104 (1986–"Reactivity of Epoxy Resin . . . Product", Muroi et al.

Primary Examiner—Melvyn I. Marquis
Assistant Examiner—Randy Gulakowski
Attorney, Agent, or Firm—Valerie E. Looper

[57] ABSTRACT

A latent curing agent for epoxy resins in the form of finely divided particles is disclosed, along with its method of preparation. An amine/epoxy adduct is formed in small particles with an encapsulating layer of polyfunctional epoxy or isocyanate on the surface by an emulsion precipitation method.

6 Claims, No Drawings

LATENT CURING AGENT FOR EPOXY RESIN AND ITS PREPARATION

TECHNICAL FIELD

The present invention relates to a fine powder of a latent curing agent for an epoxy resin and a method for the preparation of the same. More specifically, it relates to a finely divided latent curing agent which not only has a fast curability at low temperatures, excellent storage stability and solvent resistance but also gives a cured product having excellent properties when added to an epoxy resin.

The present invention also relates to a one-component heat curable composition which comprises the finely divided latent curing agent.

The present invention also relates to the use of the fine powder of a latent curing agent as the curing accelerator for high temperature curing agents in a one-component heat curable composition.

BACKGROUND ART

Because cured articles prepared from an epoxy resin have excellent adhesion, mechanical properties, thermal properties, chemical resistance and excellent electrical properties, they are utilized widely and commercially as paints, adhesives, and electrical and electronic insulation materials. Epoxy resin formulations used for such applications can be either a one-component system or a two-component system.

The two-component system is made of an epoxy resin composition and a curing agent which are separately stored. When needed, they are weighed and mixed just prior to use. Therefore, the following disadvantages have been pointed out. (1) It is difficult to avoid mistakes in weighing and to constantly preparing an uniform curable composition. (2) The variation of the properties due to incomplete mixing and defoaming easily occurs. (3) The reaction of the epoxy resin and curing agent starts as they are mixed, and the viscosity of the system increases gradually, goes through gelation and finally the system cures. Since the viscosity of the composition changes with the progression of time, it is impossible to automate the process. (4) The pot life is decided by the chemical structures and the ratio of the epoxy resin and curing agent employed.

Generally, the system with a faster curing rate has a shorter pot life. If a curing agent which is designed with an emphasis on the curing rate is used, a formula can usually be cured at room temperature or lower. However, it will naturally shorten the pot life and it creates a need to frequently formulate a small amount of the composition. Thus, such low temperature-curing compositions cause a reduction in working efficiency.

In contrast, with the one-component system, because a curing agent is added ahead of time in the epoxy resin, the above described problems associated with the two-component system are eliminated. However, in order to prepare an epoxy resin composition of one-component system having good storage stability at room temperature, a latent curing agent is required. Several latent curing agents have been proposed for this purpose. The simplest latent curing agents are dispersion type latent curing agents which are solid and incapable of dissolving in the epoxy resin at room temperature but, when heated to near its melting point, capable of dissolving in the epoxy resin to quickly start the reaction. Such latent curing agents include dicyandiamide, phenol novolac, adipic dihydrazide, diallyl melamine, diamino maleonitrile, $BF_3$-amine complex, amine salts, imidazole derivatives and the like. Although they excel in storage stability at room temperature, nearly all of them are of a type which cures at higher temperatures and unfavorably have to be cured for a long period of time at a higher temperature of 160° C. or more. Similarly, the acid anhydride curing agents, such as methylhexahydrophthalic anhydride which is liquid at room temperature, are a kind of the high temperature-curable curing agent. Reflecting the mechanism of its curing reaction, although the composition with a liquid epoxy resin having a low concentration of hydroxyl group is relatively stable at room temperature, its reaction rate is very slow. Thus, even when it is heated to about 160° C. the reaction disadvantageously proceeds with difficulty.

In case of using these high temperature-curable curing agents, it is generally known to use them together with a curing accelerator such as imidazole compounds represented by 2-ethyl-4-methylimidazole and tertiary amines represented by tris (dimethylaminomethyl)-phenol for the purpose of lowering the curing temperature. However, if a curing accelerator is added, it is possible to lower the curing temperature to a temperature of 120° C. to 150° C., but the accelerator will drastically damage the storage stability, and thus the resin cannot exhibit the advantage of the latency of the high temperature-curable curing agent.

Examples of other latent curing agents include amineimide compounds which are activated by thermal decomposition; ketimines which are activated by contact with moisture; aromatic diazonium salt compounds, diallyliodonium salt compounds, triallylsulfonium salt compounds and selenium salt compounds which are activated by irradiation with light; and curing agents which are microencapsulated in a material which can be destroyed by mechanical pressure or by heat. Of them, the most extensively investigated one is the curing agent made by treating solid particles of an amine compound/epoxy compound adduct with a polyfunctional isocyanate compound in the presence of a liquid epoxy resin, and these technologies are disclosed in Japanese Patent Publication (Kokai) No. SHO 64-70523 (1989) and Japanese Patent Publication (Kokai) HEI 1-113480 (1989). In this case it is presumed that the polyfunctional isocyanate compound has been reacted with the particles of the adduct to form an encapsulated film on their surfaces.

Amine compound/epoxy compound adducts are obtained by reacting an amine compound with an epoxy compound, and they have not only greatly improved the defects of amine curing agents, such as the volatility which creates a handling problem, the moisture absorbability which has a significant effect on the curability and the compatibility with epoxy resin, but also they allow a proper control over their melting point. From the aspect of performance, the curing agent of an anionic polymerization catalyst type such as a tertiary amine adduct which does not risk corrosion of metal is preferred. From a practical viewpoint, an imidazole compound/epoxy resin adduct is suitable for this purpose, and its technology is disclosed in Japanese Patent Publication (Kokai) No. SHO 58-13623 (1983) and Japanese Patent Publication (Kokai) No. SHO 61-268721 (1986).

According to these prior art methods, an amine compound/epoxy compound adduct can be obtained as a solid by reacting an amine compound with an epoxy resin in an organic solvent and then removing the solvent from the system. Subsequently, the solid is crushed, pulverized and classified to obtain particles of the curing agent of a desired size. In this case, the size of particles of the adduct is important. Smaller sizes may increase the curing rate, but its storage stability will become poorer. On the other hand, larger particle sizes may improve the storage stability, but the curability at low temperatures tends to be damaged. Thus, it is difficult to obtain a curing agent which can sufficiently satisfy both the curability and the storage stability.

When an amine compound is reacted with an epoxy compound, use of an excess amount of a polyfunctional epoxy compound relative to the amount of the amine will improve the storage stability of the adduct formed therefrom. It may be presumed that the excess amount of the polyfunctional epoxy compound results in the presence of polymerized epoxy resin within the particles of the adduct, which dilutes the concentration of reactive groups on the surfaces of particles of the adduct. However, when this method is used, the storage stability is improved and at the same time, the melting point of the adduct is increased. Accordingly, the curability at low temperatures will be lost. Further, although the storage stability is improved, the direct contact of the reactive groups with the resin to be formulated is unavoidable and thus, the above described adduct is not yet practical. In order to bestow a latency to crushed, pulverized and classified particles of an adduct which has a small average particle size and is presumed to have a fast curing rate, a master batch of a desired curing agent could be prepared by dispersing the particles in a liquid epoxy resin, adding a polyfunctional isocyanate compound therein under heating, and reacting the particles with the polyfunctional isocyanate compound. However, because side reactions such as the polymerization of the epoxy resin used as the dispersion medium occur under this situation, the master batch of the curing agent often has a very high viscosity and is difficult to handle. This reduces the degree of freedom of designing the formula of epoxy resin curing compositions, and thus it is not desirable.

Recently, there are many cases where an organic solvent or a reactive diluent is added to curing compositions in some application fields of epoxy resins, such as solder resist ink for electronic materials, electrically conductive paints, adhesives, impregnation for laminating boards and anti-corrosive primer for metallic coating in order to decrease the viscosity of the curing compositions. In this case, in order to prepare a one-component epoxy resin curing composition having an outstanding storage stability, the solvent resistance of the latent curing agent to be added will be important. Furthermore, in the application field of electronic materials, one-component epoxy resin curing compositions having an outstanding storage stability and fast curability at low temperatures are highly demanded for the purpose of energy saving, improvement on the productivity of a production line, and protection of electronic parts. However, in the current situation, hardly any one-component epoxy resin composition that can satisfy all of the above described requirements is known.

As stated above, in spite of the outstanding advantage of the particles of an amine compound/epoxy compound adduct as the curing agent for epoxy resin, they have not been taken advantage of fully because the one-component epoxy resin curing composition has the above described various problems.

To use the advantage of the one-component epoxy resin curing composition, there is a high demand for fine powder of a latent curing agent which requires merely a simplified production process with a reduced production cost and has easily controllable particle size and has high solvent resistance, fast curability at low temperatures and high storage stability and can give excellent chemical and physical properties to the cured product.

As a result of an extensive study to overcome the problems of the particles of amine compound/epoxy compound adducts of the prior art and to develop a curing agent that can take a full advantage of the one-component epoxy resin curing composition based on the above described viewpoints, the present inventors have discovered that fine substantially spherical particles of an amine compound/epoxy compound adduct having a well-controlled particle size can be obtained in one step by selecting an organic solvent capable of dissolving both the amine compound and the epoxy compound but incapable of dissolving the adduct formed therefrom to carry out the reaction in the presence of a suitable dispersion stabilizer and stably dispersing the particles of the adduct formed without aggregating the particles, and further that the fine spherical particles obtained are extremely useful as the latent curing agent for epoxy resin. Based on this discovery, a patent application was filed as U.S. Ser. No. 706,131 on May 28, 1991 and which is incorporated herein by reference as if set forth in full.

SUMMARY OF THE INVENTION

A latent curing agent for an epoxy resin in accordance with the invention is fine powder of an amine compound/epoxy compound adduct wherein the powder has an encapsulating layer of a polymerized polyfunctional epoxy compound on its surface.

In another aspect of the invention, a latent curing agent for epoxy resin is a fine powder of an amine compound/epoxy compound adduct wherein the powder has a mixed encapsulating layer of a polymerized polyfunctional epoxy compound and a polymerized polyfunctional isocyanate compound on its surface.

In a further aspect of the invention, a latent curing agent for epoxy resin is fine powder of an amine compound/epoxy compound adduct wherein the powder has an encapsulating layer of a polymerized polyfunctional isocyanate compound on the encapsulating layer of a polymerized polyfunctional epoxy compound on its surface.

In a still further aspect of the invention, a latent curing agent for an epoxy resin is a fine powder of an amine compound/epoxy compound adduct reacted with a carboxylic acid, wherein the powder has a mixed encapsulating layer of a polymerized polyfunctional epoxy compound and a polymerized polyfunctional isocyanate compound on its surface.

In another aspect of the invention, a latent curing agent for an epoxy resin is a fine powder made of an amine compound/epoxy compound adduct reacted with a carboxylic acid, wherein the powder has an encapsulating layer of a polymerized polyfunctional isocyanate compound on an encapsulating layer of a polymerized polyfunctional epoxy compound on its surface. The present invention also includes a method of making a fine powder of a latent curing agent for an epoxy resin which comprises the steps of:

(a) substantially stoichiometrically reacting an amine compound with an epoxy compound in the presence of a dispersion stabilizer in an organic solvent capable of dissolving both the amine compound and the epoxy compound but incapable of dissolving the amine compound/epoxy compound adduct formed therefrom at elevated temperatures with agitation to form particles of the amine compound/epoxy compound adduct;

(b) reacting the particles with a polyfunctional epoxy compound in the presence of the dispersion stabilizer in the organic solvent at elevated temperatures with agitation; and (c) recovering the particles thus formed from the reaction mixture.

In another aspect of the invention, a method for preparing a finely divided powder of a latent curing agent for an epoxy resin comprises the steps of:

(a) substantially stoichiometrically reacting an amine compound with an epoxy compound in the presence of a dispersion stabilizer in an organic solvent capable of dissolving both the amine compound and the epoxy compound but incapable of dissolving the amine compound/epoxy compound adduct formed therefrom at elevated temperatures with agitation to form particles of the amine compound/epoxy compound adduct;

(b) reacting the particles with a polyfunctional epoxy compound in the presence of the dispersion stabilizer in said organic solvent at evaluated temperatures with agitation;

(c) reacting the particles formed with a polyfunctional isocyanate compound in an organic reaction medium at elevated temperatures with agitation; and (d) recovering the particles thus formed from the reaction mixture.

In a further aspect of the invention, a method of making a fine powder of a latent curing agent for an epoxy resin comprises the steps of:

(a) substantially stoichiometrically reacting an amine compound with an epoxy compound in the presence of a dispersion stabilizer in an organic solvent capable of dissolving both the amine compound and the epoxy compound but incapable of dissolving the amine compound/epoxy compound adduct formed therefrom at elevated temperatures with agitation to form particles of the amine compound/epoxy compound adduct;

(b) reacting the particles with a polyfunctional epoxy compound in the presence of the dispersion stabilizer in the organic solvent at evaluated temperatures with agitation;

(c) reacting the particles formed with a polyfunctional isocyanate compound in an organic reaction medium at elevated temperatures with agitation;

(d) recovering the particles thus formed from the reaction mixture; and (e) either
  (1) adding a carboxylic acid before the stoichiometric reaction of the amine compound with the epoxy compound in step (a),
  (2) reacting the particles formed in step (a) with a carboxylic acid before step (b), or
  (3) reacting the particles formed in step (b) with a carboxylic acid before step (c).

In a still further aspect of the invention, a method for the preparation of a fine powder of a latent curing agent for an epoxy resin comprises the steps of:

(a) reacting an amine compound with an excess of a polyfunctional epoxy compound in the presence of a dispersion stabilizer in an organic solvent capable of dissolving both the amine compound and the polyfunctional epoxy compound but incapable of dissolving the amine compound/epoxy compound adduct formed therefrom at elevated temperatures with agitation to form particles of the amine compound/epoxy compound adduct; and (b) recovering the particles from the reaction mixture.

In another aspect of the invention, a method of making a finely divided latent curing agent for an epoxy resin comprises the steps of:

(a) reacting an amine compound with a polyfunctional epoxy compound in an excess amount relative to the amount of the amine compound in the presence of a dispersion stabilizer in an organic solvent capable of dissolving both the amine compound and the polyfunctional epoxy compound but incapable of dissolving the amine compound-/epoxy compound adduct formed therefrom at elevated temperatures with agitation to form particles of the amine,compound/epoxy compound adduct;

(b) reacting the particles formed with a polyfunctional isocyanate compound in an organic reaction medium at elevated temperatures with agitation; and (c) recovering said particles from the reaction mixture.

In still another aspect of the invention, a method for the preparation of a fine powder of a latent curing agent for an epoxy resin comprises the steps of:

(a) reacting an amine compound with an excess of a polyfunctional epoxy compound in the presence of a dispersion stabilizer in an organic solvent capable of dissolving both the amine compound and the polyfunctional epoxy compound but incapable of dissolving the amine compound/epoxy compound adduct formed therefrom at elevated temperatures with agitation to form particles of the amine compound/epoxy compound adduct;

(b) reacting the particles formed with a polyfunctional isocyanate compound in an organic reaction medium at elevated temperatures with agitation;

(c) recovering the particles from the reaction mixture; and (d) either
  (1) adding a carboxylic acid before the reaction of the amine compound with the polyfunctional epoxy compound in step (a) or
  (2) reacting the particles formed in step (a) with a carboxylic acid before step (b).

In a further aspect of the invention, a method for the preparation of a fine powder of a latent curing agent for epoxy resin comprises the steps of:

(a) substantially stoichiometrically reacting an amine compound with an epoxy compound at elevated temperatures with agitation to form an amine compound/epoxy compound adduct;

(b) pulverizing the adduct to particles having a predetermined particle size;

(c) dispersing the particles in an organic reaction medium;

(d) reacting the particles with a polyfunctional epoxy compound in the organic reaction medium at elevated temperatures with agitation; and
(e) recovering the particles thus formed from the reaction mixture.

In a still further aspect of the invention, a method for the preparation of a fine powder of a latent curing agent for epoxy resin comprises the steps of:
(a) substantially stoichiometrically reacting an amine compound with an epoxy compound at elevated temperatures with agitation to form an amine compound/epoxy compound adduct;
(b) pulverizing the adduct to particles having a predetermined particle size;
(c) dispersing the particles in an organic reaction medium;
(d) reacting the particles with a polyfunctional epoxy compound in the organic reaction medium at elevated temperatures with agitation;
(e) reacting the particles thus formed with a polyfunctional isocyanate compound in the organic reaction medium at elevated temperatures with agitation; and
(f) recovering the particles thus formed from the reaction mixture.

In a yet further aspect of the invention, a method for the preparation of fine powder of a latent curing agent for epoxy resin comprises the steps of:
(a) substantially stoichiometrically reacting an amine compound with an epoxy compound at elevated temperatures with agitation to form an amine compound/epoxy compound adduct;
(b) pulverizing the adduct to particles having a predetermined particle size;
(c) dispersing the particles in an organic reaction medium;
(d) reacting the particles with a polyfunctional epoxy compound in the organic reaction medium at elevated temperatures with agitation;
(e) reacting the particles thus formed with a polyfunctional isocyanate compound in the organic reaction medium at elevated temperatures with agitation;
(f) recovering the particles thus formed from the reaction mixture; and
(g) either
(1) adding a carboxylic acid before the stoichiometric reaction of the amine compound with the epoxy compound in step (a),
(2) reacting the adduct formed in step (a) with a carboxylic acid before step (b),
(3) reacting the particles in step (c) with a carboxylic acid before step (d), or
(4) reacting the particles formed in step (d) with a carboxylic acid.

In a further aspect of the invention, a method for the preparation of fine powder of a latent curing agent for epoxy resin comprises the steps of:
(a) reacting an amine compound with a polyfunctional epoxy compound in an excess amount relative to the amount of the amine compound at elevated temperatures with agitation to form an amine compound/epoxy compound adduct; and
(b) pulverizing the adduct to particles having a predetermined particle size.

In still another aspect of the invention, a method for the preparation of fine powder of a latent curing agent for epoxy resin comprises the steps of:
(a) reacting an amine compound with a polyfunctional epoxy compound in an excess amount relative to the amount of the amine compound at elevated temperatures with agitation to form an amine compound/epoxy compound adduct;
(b) pulverizing the adduct to particles having a predetermined particle size;
(c) dispersing the particles in an organic reaction medium;
(d) reacting the particles with a polyfunctional isocyanate compound in the organic reaction medium at elevated temperatures with agitation; and
(e) recovering the particles thus formed from the reaction mixture.

In another aspect of the invention, a method for the preparation of a fine powder of a latent curing agent for an epoxy resin comprises the steps of:
(a) reacting an amine compound with an excess of polyfunctional epoxy compound at elevated temperatures with agitation to form an amine compound/epoxy compound adduct;
(b) pulverizing the adduct to particles having a predetermined particle size;
(c) dispersing the particles in an organic reaction medium;
(d) reacting the particles with a polyfunctional isocyanate compound in the organic reaction medium at elevated temperatures with agitation;
(e) recovering the particles thus formed from the reaction mixture; and
(f) either
(1) adding a carboxylic acid before the reaction of the amine compound with the polyfunctional epoxy compound in step (a),
(2) reacting the adduct formed in step (a) with a carboxylic acid before step (b), or
(3) reacting the particles in step (c) with a carboxylic acid before step (d).

The present invention further includes fine powder of a latent curing agent for epoxy resin obtained by any one of the above described methods.

The present invention still further includes a heat curable composition of one-component type comprising, as the major components, an epoxy resin and any one of the above described latent curing agents for epoxy resin.

In another aspect of the invention, a heat curable composition of one-component type comprises, as the major components, an epoxy resin and fine powder of a latent curing agent for epoxy resin obtained by any one of the above described methods.

In further aspect of the invention, a method comprises using any one of the above described latent curing agents for epoxy resin as the curing accelerator for a high temperature curing agent.

In a still further aspect of the invention, a method comprises using the fine powder of a latent curing agent for epoxy resin obtained by any one of the above described methods as the curing accelerator for a high temperature curing agent.

DETAILED DESCRIPTION OF THE INVENTION

For purposes of clarity in describing the present invention, each of the following terms have the meaning stated below throughout the present description and the claims appended hereto:

"Stoichiometric reaction of the amine compound with the epoxy compound" means that the reaction of the amine compound with the epoxy compound is carried out in such a way that the concentration of active hydrogens in the amine compound and the concentration of epoxy groups in the polyfunctional epoxy compound is at an equivalent ratio of 1.0.

"An excess amount of the epoxy compound relative to the amount of the amine compound" means that the concentration of active hydrogens in the amine compound is lower than the concentration of epoxy groups in the epoxy compound or the polyfunctional epoxy compound.

"Room temperature" means a temperature of 20° C. to 25° C.

In the present invention the amine compounds and the epoxy compounds which can be employed as the starting materials for the preparation of the latent curing agent are selected based on the consideration of the properties of the adduct as the curing agent. Important aspects are its chemical structure which promotes the curing reaction by anionic polymerization, its melting point, and its compatibility with the epoxy resin which will be cured in a molten state, its quick curability and its effect of addition (high curing reactivity with a smallest possible amount of addition).

While any kind of amine compound can be used for the present invention, the selection thereof will be determined by the kind of epoxy compound to be combined since in the present invention the reaction has to be stopped at the state of addition reaction with avoidance of polymerization reaction. While it is possible to use any kind of amine compounds which have at least one active amino-hydrogen in their molecule with monofunctional epoxy compounds, the amine which can be combined with polyfunctional epoxy compounds is an amine compound which has only one active amino-hydrogen, i.e., having a secondary amino group, in its molecule which contributes to the addition reaction with the epoxy group. Use of compounds having at least one tertiary amino group, i.e., having no active hydrogen, is also permitted, since the presence of the tertiary amino group is desirable for increasing the concentration of amino groups which contribute to the curing reaction of the adduct, or in other words, to increase the effect of the curing agent. If this condition for combination is met, any combinations of one, two or more kinds of amine compounds can be employed.

Exemplary amine compounds which can be combined with polyfunctional epoxy compounds in the present invention include imidazoles represented by 2-methylimidazole and 2,4-dimethylimidazole; imidazolines represented by imidazoline and 2-methyl imidazoline; piperazines represented by N-methyl piperazine and N-hydroxylethyl piperazine; anabasines represented by anabasine; pyrazoles represented by 3,5-dimethyl pyrazole; purines represented by tetramethyl quinidine and purine; and triazoles represented by 1,2,4-triazole.

Any kind of epoxy compound can be employed as the other starting material for the adduct. Exemplary epoxy compounds include monofunctional epoxy compounds such as n-butyl glycidyl ether, styrene oxide and phenylglycidyl ether; bifunctional epoxy compounds such as bisphenol A diglycidyl ether, bisphenol F diglycidyl ether, bisphenol S diglycidyl ether and diglycidyl phthalate; trifunctional epoxy compounds such as triglycidyl isocyanurate, triglycidyl p-aminophenol; tetrafunctional epoxy compounds such as tetraglycidyl m-xylene diamine and tetraglycidyl diaminodiphenylmethane; and compounds having more functional groups such as cresol novolac polyglycidyl ether and phenol novolac polyglycidyl ether. The selection of epoxy compounds is also determined by the type of the amine compound to be combined. Thus, while the amine compounds having only one active hydrogen can be combined with any kind of epoxy compounds, monofunctional epoxy compounds alone can be combined with the amine compounds having two or more active hydrogens.

The epoxy compounds are also selected by considering the melting point of the adduct formed and the compatibility in a molten state with respect to the epoxy resin which is to be cured. Since the majority of the epoxy resins to be cured comprise bisphenol A diglycidyl ether, this compound which possesses advantageous compatibility and cost savings is most typically used as the starting material for the preparation of an adduct.

With an epoxy compound, the concentration of epoxy group is expressed by a reciprocal number of. "epoxy equivalent weight (gram per equivalent)". Lower epoxy equivalent weights give higher concentrations of epoxy groups. Higher concentrations of epoxy groups are desirable for the increase of concentration of tertiary nitrogen atoms in the adduct. Thus, a lowest possible epoxy equivalent weight is desirable for the epoxy compound. Epoxy compounds having an epoxy equivalent weight of, at most, 1,000, and preferably at most 500 are typically employed.

The melting point of the amine compound/epoxy compound adduct is influenced by the chemical structures of the amine compound and the epoxy resin employed, the method of addition, the structure of the adducts formed, and the ratio of the addition of the epoxy resin to the amine compound. With a proper selection of these factors, the synthesis of desired adducts having a low melting point to a high melting point is possible. While higher melting points will make the adduct easier to handle, they will also raise the curing reaction-onset temperature of their reaction mixture. Therefore, from the viewpoint of curability, lower melting points are preferred. However, if workability, particularly the workability during summer season, is taken into consideration, the melting point has to be at least 50° C.

The amine compound/epoxy compound adduct is usually synthesized at an equivalent ratio of 1.0 or in an excess amount of the amine compound. However, when a monofunctional epoxy compound is used, an excess amount of the epoxy compound will lower the melting point of the adduct formed therefrom. On the other hand, when a polyfunctional epoxy compound is used, an excess amount of the polyfunctional epoxy compound will cause competition between the addition reaction and the polymerization reaction, and the melting point of the adduct will rise. Although there is no particular restriction in the present invention about the reaction equivalent ratio of the epoxy compound and the amine compound in the preparation of the amine compound/epoxy compound adduct, the stoichiometric amount serves as the basis.

In one embodiment of the present invention, first, an amine compound is substantially stoichiometrically reacted with an epoxy compound in the presence of a dispersion stabilizer in an organic solvent capable of dissolving both the amine compound and the epoxy compound but incapable of dissolving the amine compound/epoxy compound adduct formed therefrom at elevated temperatures with agitation to form substantially spherical particles of an amine compound/epoxy compound adduct. Second, the particles of the amine compound/epoxy compound adduct are reacted with a polyfunctional epoxy compound in the presence of the dispersion stabilizer in the organic solvent at elevated temperatures with agitation to form particles having an encapsulating layer of a polymerized polyfunctional epoxy compound on their surfaces.

Any polyfunctional epoxy compounds including the above described bifunctional, trifunctional, tetrafunctional and other polyfunctional epoxy compounds can be used as the polyfunctional epoxy compound in the second step to form the encapsulating layer on the surfaces of particles of the adduct. However, there is not any upper limit for their epoxy equivalent weights. The polyfunctional epoxy compound may be used as the epoxy compound in the first step and in such a case the same or different polyfunctional epoxy compound may be used in the second step.

Furthermore, as a variation of the second step, the polyfunctional epoxy compound may be added before the start of the reaction to form the adduct or during the reaction.

The amount of the polyfunctional epoxy compound which can be used may vary depending on the particle size of the adduct to be formed, and the amount is typically 1 to 100 parts by weight, preferably 5 to 50 parts by weight based on 100 parts by weight of the adduct. When the amount is less than 1 part by weight, the latency as the latent curing agent for epoxy resin will not be sufficient and the one-component epoxy resin curing composition added with such a curing agent will not have enough storage stability. On the other hand, when the amount exceeds 100 parts by weight, the low temperature curability of the curing agent will be lost.

It is also important to select a solvent which can dissolve the amine compound and the epoxy compound and/or the polyfunctional epoxy compound as the starting materials but can precipitate the adduct in the form of particles without dissolution. Generally, a substance can dissolve in a solvent having a similar polarity. The level of the polarity of a solvent or a substance is often expressed by a solubility parameter having units $(cal/cm^3)^{\frac{1}{2}}$. A typical range of solubility parameters of epoxy compounds will be 8 to 11 $(cal/cm^3)^{\frac{1}{2}}$ and that of amine compounds will be 8 or greater, and that of the amine compound/epoxy compound adduct will be 11 to 16. Thus, in order to achieve the desired precipitation or dispersion addition reaction of the present invention, it is suitable to use a solvent having a solubility parameter of 8 to 11.

Examples of such solvents that can be used in the present invention are methyl ethyl ketone, methyl isobutyl ketone, methyl isopropyl ketone, acetone, n-butyl acetate, isobutyl acetate, ethyl acetate, methyl acetate, tetrahydrofuran, 1,4-dioxane, 2-ethoxyethanol, ethylene glycol monomethyl ether, diethylene glycol dimethyl ether, methyphenylether, toluene, p-xylene, benzene, cyclohexane, methylene chloride, chloroform, trichloroethylene, chlorobenzene and pyridine. These solvents can be used alone, or two or more solvents can be used together. It is also possible to use the solvents having a solubility parameter outside the range of 8 to 11 if two or more solvents are combined to bring the solubility parameter within the above-described specified range.

However, since the precise solubility parameter of the solvents to be used may naturally differ depending on the chemical structures of the amine compound and the epoxy compound and/or the polyfunctional epoxy compound, it is essential to make a precise selection for each individual situation.

The dispersion stabilizer creates a stable dispersion of the particles of the adduct which precipitate in the solvent during the precipitation or dispersion addition reaction. Without such a dispersion stabilizer, the particles of the adduct formed may aggregate to cause phase separation, and thus the desired spherical particles cannot be obtained. Polymeric compounds having strong affinity to both the organic solvent and the adduct formed are suitable as the dispersion stabilizer for the present invention. From the standpoint of chemical structure any graft copolymers, block copolymers, random copolymers, and other polymers may be employed.

Exemplary graft copolymers include poly[(methyl methacrylate-co-methacrylic acid)-g-styrene], poly[methyl methacrylate-co-2-hydroxyethyl methacrylate)-g-styrene], poly[(methyl methacrylate-co-glycidyl methacrylate)-g-styrene], poly[(styrene-co-glycidyl methacrylate)-g-styrene], poly(2-hydroxyethyl methacrylate-g-styrene), poly(2,3-dihydroxypropyl methacrylate-g-styrene), poly(2-acrylamido-2-methylpropane sulfonic acid-g-styrene), poly(vinyl acetate-g-styrene), poly(methacrylic acid-g-styrene), poly(acrylamide-g-styrene), poly(ethylene oxide-g-styrene), poly(4-vinyl-N-ethylpyridium bromide-g-styrene), poly[(methyl methacrylate-co-methacrylic acid)-g-C1~12 alkyl methacrylate], poly[(methyl methacrylate-co-fluoroalkyl acrylate)-g-methyl methacrylate], poly[(methyl methacrylate-co-glycidyl methacrylate)-g-methyl methacrylate], poly[styrene-co-glycidyl methacrylate)-g-methyl methacrylate], poly(vinyl alcohol-g-methyl methacrylate), poly[(methyl methacrylate-co-glycidyl methacrylate)-g-methacrylic acid], poly(butadiene-g-methacrylic acid), poly(methyl methacrylate-g-2-hydroxyethyl methacrylate), poly(methyl methacrylate-g-N-methylol acrylamide), poly(2-hydroxyethyl methacrylate-g-N-methylol acrylamide), poly(methylmethacrylate-g-12-hydroxystearic acid), poly[(methyl acrylate-co-methacrylic acid)-g-12-hydroxystearic acid], poly[styrene-comethacrylic acid) g-12-hydroxystearic acid], poly[(ethyl acrylate-comethacrylic acid)-g-lauryl methacrylate], poly(vinyl acetate-g-2-ethylhexyl acrylate) and poly(chloroprene-g-2-ethylhexyl acrylate); block copolymers such as poly(vinyl acetate-b-styrene), poly(styrene-b-dimethyl-siloxane), poly(styrene-b-methacrylic acid), poly(lauryl methacrylate-b-methacrylic acid), poly(ethylene oxide-b-styrene-b-ethylene oxide) and poly(12-hydroxystearic acid-b-ethylene oxide-b-12-hydroxystearic acid); exemplary random copolymers such as poly(vinyl acetate-co-vinyl alcohol), poly(N-vinylpyrrolidone-co-vinyl acetate), poly(N-vinylpyrrolidone-co-methyl methacrylate) and poly(-long chain methacrylate or acrylate-co-N-vinylpyrrolidone); and other polymers such as carboxylic acid-modified glycol polyphthalates and quaternized amine-modified polyesters.

It is important to control the particle size of the resulting particles of the adduct and to create a stable reaction for forming the particles of the adduct without causing any aggregation.

The particle size of the adduct is determined by the types of the starting materials and the solvent employed, the reaction conditions selected and the type and amount of the dispersion stabilizer employed. Of these factors, the chemical and molecular structures of the dispersion stabilizer selected are an important factor. For example, in the precipitation or dispersion addition reaction of 2-methylimidazole and bisphenol A diglycidyl ether in methyl isobutyl ketone, a graft copolymer of poly [methyl methacrylate-co-methacrylic acid)-g-styrene]as the dispersion stabilizer will give a three micron sized particle. On the other hand, a quaternized amine-modified polyester will give fine spherical particles having a particle size of less than one micron, i.e., sub-micron. Generally, smaller molecular weights of the dispersion stabilizer increase the particle size of the particles of the adduct formed. On the other hand, higher molecular weights of the dispersion stabilizer increase the stabilizing effect but if the molecular weight exceeds a certain limit, it will enhance aggregation of the particles. Thus, a preferred range of the molecular weight of the dispersion stabilizer in the present invention is from 1,000 to 500,000, a more preferred range is from 2,000 to 300,000.

Another factor which can have a significant effect is the reaction conditions employed. Generally, the particle size of the adduct decreases with increased concentrations of the dispersion stabilizer, reaction temperatures and rates of agitation and decreases with decreased reactant concentrations and conversions. These tendencies are also affected by the chemical structure of the specific dispersion stabilizer employed. The volume average particle size of the resulting particles of the adduct can be controlled from 0.05 mm to 100 mm by the combination of the above described factors.

The stability of the reaction system depends on the concentration of the starting materials, the concentration of the dispersion stabilizer, the reaction temperature, the agitation condition and the conversion or the reaction time. The amount of the dispersion stabilizer employed is typically 1 to 40% by weight, preferably 5 to 30% by weight based on the total weight of the amine compound and the epoxy compound and/or the polyfunctional epoxy compound. When the total concentration of the starting materials and the reaction temperature are too high, aggregates may easily form even in the presence of a suitable amount of the dispersion stabilizer to render the reaction system unstable although the rate of the addition reaction is increased. Accordingly, the total concentration of the starting materials, i.e., the amine compound and the epoxy compound and/or the polyfunctional epoxy compound, is typically 2 to 40% by weight, preferably 5 to 30% by weight based on the total weight of the reaction system, and the reaction temperature which can be employed in the first and second steps is typically 40° C. to 90° C., preferably 50° C. to 70° C.

Further, the stability of the reaction system relates to the agitation condition and the concentration of the amine compound and the epoxy compound. An optimal agitation rate will vary depending on the composition of the starting materials, reaction conditions and the configuration of an agitation wing. However, excessively fast agitation will enhance the formation of aggregates, while excessively slow agitation is not suitable for the preparation of spherical particles. Thus, the agitation rate will vary for each individual reaction system and thus will be determined by conventional trial and error techniques. The agitation rate is typically 50 to 1,000 r.p.m., preferably 100 to 500 r.p.m. Aggregates are usually more easily formed at higher conversions. As stated above on the tendency, aggregates start to form at higher concentrations of the starting materials and reaction temperatures, lower concentrations of the dispersion stabilizer and smaller particle sizes of the adduct formed. However, it is possible by adjusting the conditions that the conversion reaches 100%.

In a second embodiment of the present invention, an amine compound is reacted with a polyfunctional epoxy compound in an excess amount relative to the amount of the amine compound in the presence of the dispersion stabilizer in the organic solvent at elevated temperatures with agitation to form spherical particles of the adduct having an encapsulating layer of a polymerized polyfunctional epoxy compound on their surfaces.

In a third embodiment of the present invention, after substantially spherical particles of the adduct having an encapsulating layer of a polymerized polyfunctional epoxy compound on their surfaces are formed by (a) substantially stoichiometrically reacting an amine compound with an epoxy compound in the presence of the dispersion stabilizer in the organic solvent at elevated temperatures with agitation to form spherical particles of the amine compound/epoxy compound adduct and subsequently reacting the particles with a polyfunctional epoxy compound in the presence of the dispersion stabilizer in the organic solvent at elevated temperatures with agitation or (b) reacting an amine compound with a polyfunctional epoxy compound in an excess amount relative to the amine compound in the presence of the dispersion stabilizer in the organic solvent at elevated temperatures with agitation, the resulting particles are reacted with a polyfunctional isocyanate compound in an organic reaction medium at elevated temperatures with agitation to form an encapsulating layer of a polymerized polyfunctional isocyanate compound on the encapsulating layer of the polymerized polyfunctional epoxy compound or a mixed encapsulating layer of a polymerized polyfunctional epoxy compound and a polymerized polyfunctional isocyanate compound on the surfaces of the particles. The latency of the resulting substantially spherical particles of the adduct as a latent curing agent can further be improved by this encapsulating layer of a polymerized polyfunctional isocyanate compound or the mixed encapsulating layer of the polymerized polyfunctional epoxy compound and a polymerized polyfunctional isocyanate compound.

Exemplary polyfunctional isocyanate compounds include the mononuclear and polynuclear species of tolylene diisocyanates and diphenylmethane-4,4'-diisocyanate, hydrogenated diphenylmethane-4,4'-diisocyanate, 1,5-naphthalene diisocyanate, isophorone diisocyanate, hexamethylene diisocyanate, xylylene diisocyanate, hydrogenated xylylene diisocyanate, tetramethylxylene diisocyanate, 1,3,6-hexamethylene triisocyanate, lysine diisocyanate, triphenylmethane triisocyanate, tris(isocyanate phenyl)thiophosphate, polyfunctional isocyanate compounds formed by addition of such compounds such as polymethylene polyphenyl polyisocyanate and other active hydrogen-containing compound and any mixtures thereof. Such polyfunctional isocyanate compounds are selected from those which can be soluble in the organic reaction medium.

The amount of the polyfunctional isocyanate compound employed to make the particles of the adduct may vary depending on the size of the particles of the adduct, and for the particles having a volume average particle size of 0.05 μm to 100 μm, the polyfunctional isocyanate compound is employed in an amount of 0.1 to 100 parts by weight, preferably 1 to 50 parts by weight based on 100 parts by weight of the particles of the adduct. When the amount of the polyfunctional isocyanate compound is less than 0.1 part by weight, sufficient storage stability cannot be obtained. On the other hand, amounts of more than 100 parts by weight require a remarkably long reaction time and lowers the curability.

The same organic solvents as described in the first embodiment can be used as the organic reaction medium. The reaction temperature which can be employed is typically room temperature to 90° C., preferably 50° C. to 70° C.

In a fourth embodiment of the present invention, a carboxylic acid is added before the reaction of the amine compound with the epoxy compound and/or the polyfunctional epoxy compound to form particles of the adduct or is reacted in the organic solvent with the particles of the adduct or after the reaction of the particles of the adduct with the polyfunctional epoxy compound before the reaction of the particles with the polyfunctional isocyanate compound in the third embodiment. The onset temperature of the curing reaction of the latent curing agent can be drastically reduced by this reaction with the carboxylic acid. Thus, the quick curability at low temperatures of the particles thus obtained can be remarkably improved.

Any kind of carboxylic acids can be used for the present invention and they may be monocarboxylic acids or polycarboxylic acids, or aliphatic carboxylic acids, alicyclic carboxylic acids or aromatic carboxylic acids.

Exemplary carboxylic acids include aliphatic monocarboxylic acids such as acetic acid, trimethylacetic acid, propionic acid, n-butyric acid, isobutyric acid, 2-methylbutyric acid, n-valeric acid, isovaleric acid, 3-methylvaleric acid, hexanoic acid, 2-ethylhexanoic acid, octanoic acid, n-decanoic acid and lauric acid; aliphatic dicarboxylic acid such as tartaric acid, malonic acid, methylmalonic acid, dimethylmalonic acid, succinic acid, methylsuccinic acid, 2,2-dimethylsuccinic acid, 2,3-dimethylsuccinic acid, glutaric acid, 2-methylglutaric acid, adipic acid, suberic acid, sebacic acid and dodecane dicarboxylic acid; alicyclic dicarboxylic acids such as cyclopropane carboxylic acid, 1-methylcyclopropane carboxylic acid, cyclobutane carboxylic acid, cyclopentane carboxylic acid, cyclohexane carboxylic acid and cycloheptane carboxylic acid; alicyclic dicarboxylic acids such as 1,1-cyclobutane dicarboxylic acid, 1,2-cyclohexane dicarboxylic acid, 1,4-cyclohexane dicarboxylic acid and hexahydro-4-methylphthalic acid; aromatic carboxylic acids such as benzoic acid, p-t-butylbenzoic acid, o-benzoylbenzoic acid, toluic acid, phthalic acid, isophthalic acid, salicylic acid, phenylacetic acid, diphenylacetic acid, p-methoxyphenylacetic acid, phenoxyacetic acid, protocatechuic acid, benzylic acid and trimellitic acid. These carboxylic acids can be used alone, or two or more kinds can be used together. However, they have to be soluble in the solvent of the reaction system employed.

The amount of the carboxylic acid may vary depending on the adduct used and the carboxylic acid selected, and is typically 1 to 200% by weight, preferably 5 to 100% by weight based on the weight of the adduct.

In a fifth embodiment of the present invention, a pulverized latent curing resin is prepared. First, an amine compound is substantially stoichiometrically reacted with an epoxy compound at elevated temperature with agitation to form a solid mass of an amine compound/epoxy compound adduct. Second, the solid mass is crushed, pulverized and classified to particles having a predetermined particle size. Third, the particles are dispersed in an organic reaction medium. Fourth, the particles are reacted with a polyfunctional epoxy compound in the organic reaction medium at elevated temperatures with agitation to form particles of the adduct having an encapsulating layer of a polymerized polyfunctional epoxy compound on their surfaces.

In a sixth embodiment of the invention, the particles formed in the fifth embodiment are further reacted with a polyfunctional isocyanate compound in an organic reaction medium at elevated temperature with agitation to form a second encapsulating layer made of a polymerized polyfunctional isocyanate compound outside the encapsulating layer of the polymerized polyfunctional epoxy compound or a mixed encapsulating layer of a polymerized polyfunctional isocyanate compound and the polymerized polyfunctional epoxy compound. A seventh embodiment of the present invention is a variation of the fifth embodiment. First, an amine compound is reacted with an excess of a polyfunctional epoxy compound as described above to form a solid mass of an amine compound/epoxy compound adduct mixed with some polymerized polyfunctional epoxy compound. Second, the solid mass is crushed, pulverized and classified to particles having a predetermined particle size. It is presumed that the polymerized polyfunctional epoxy compound of the resulting particles partially exists on the surface layer of the particles.

An eighth embodiment of the invention is a variation of the sixth embodiment. The particles obtained in the seventh embodiment are dispersed in an organic reaction medium. Then, the particles are reacted with a polyfunctional isocyanate compound in the organic reaction medium at elevated temperatures with agitation to form particles having an encapsulating layer of a polymerized polyfunctional isocyanate compound outside the encapsulating layer of the polymerized polyfunctional epoxy compound or a mixed encapsulating layer of a polymerized polyfunctional isocyanate compound and the polymerized polyfunctional epoxy compound on their surfaces.

In the above described fifth to eighth embodiments, the first step may be carried out in the absence of a solvent. However, it is preferred to use an organic solvent from the purposes of removing the heat of reaction and carrying out a uniform reaction. The same organic solvents as described in the first embodiment can be used. These and other organic solvents can be used to make the organic reaction medium, also described above. When an organic solvent is used, the adduct can be obtained as a solid by removing the organic solvent by evaporation under reduced pressure with heating. Then, the solid is crushed by a cutter mill or a pin mill and finely pulverized in a jet mill or a centrifugation-classification mill to make particles having a volume average particle size of several microns. The classification of the finely pulverized particles is carried out by a sieve or a dry type centrifugal air classifier such as an air separator and a micron separator to give particles having a desired particle size range. In order to disperse the particles in the organic reaction medium without precipitation and aggregation, high speed mechanical agitation can preferably be employed and also, the dispersion stabilizer as described above can be appropriately added.

In the ninth embodiment of the present invention where the quick curability at low temperatures of the pulverized type latent curing agent obtained in the fifth to eighth embodiments can remarkably be improved, a carboxylic acid is added before the reaction of the amine compound with the epoxy compound and/or the polyfunctional epoxy compound to form the adduct or is reacted with the adduct before or after the pulverization of the adduct or after the reaction with the particles of the adduct with the polyfunctional epoxy compound before the reaction of the particles with the polyfunctional isocyanate compound in the sixth and eighth embodiments. The same carboxylic acids as described in the fourth embodiment can be used.

In the above described embodiments, the particles of the final product can be recovered by spray-drying with a spray drier designed for organic solvents or by flocculation-filtration or filtration followed by drying. The spray-drying is most effective, and with a cooling device attached to the spray drier, the organic solvent or the organic reaction medium used in the reaction can be almost completely recovered and can be advantageously reused for the next reaction. When no spray drier is used, it is fairly difficult to recover the particles, which are dispersed in the organic solvent or reaction medium and whose particle size is small, by the ordinary filtration method or gravitational sedimentation methods. In this case, a flocculent is added to the reaction mixture to precipitate the dispersed particles, and the particles are recovered by filtration or centrifugation. When dried at a predetermined temperature, the particles can be recovered in a 100% yield. The used organic solvent or reaction medium is subjected to fractionation distillation and can be reused as in the case of spray drying.

The thickness of the encapsulating layers varies depending on the particle size of the particles of the adduct before the reaction with the epoxy or isocyanate and the amount of the epoxy isocyanate used. Accordingly, the final particle size of the particles of curing agent can be regulated by these factors, and the volume average particle size of the curing agent according to the present invention is 0.1 to 200 mm.

The term "volume average particle size" as used herein means volume basis average Stokes diameter (hereinafter referred to as "volume average particle size") measured by the gravitational or centrifugal sedimentation method as described in "Powder, Theory and Applications", Chapters 6.3.4 and 6.3.6 (published by Maruzen, 1979).

The particles of curing agent according to the present invention provides a variety of advantages to the curing agent itself or the curing composition which is blended with the curing agent. The advantages are indicated below.

a. Due to high bulk density, the packaging volume can be reduced, thus, reducing packaging and shipping costs.
b. Dispersibility into epoxy resin is good, thus giving a more uniform structure.
c. Increase in viscosity after addition to epoxy resin is small. This desirable feature provides a higher degree of freedom for formulation design.
d. The curing agent itself is a fine powder and can be stored at room temperature for a very long period of time.

The above described features allow the particles of latent curing agent of the present invention to be used as a latent curing agent of a one-component curing composition for epoxy resin for a broad range of applications. Examples are structural adhesives, such as adhesives for assembly of automobiles, adhesives for assembly of optical equipment; and adhesives for assembly of electronic and electrical equipment; powder paint in the paint field, baking paint, and the like; impregnation of glass cloth for printed circuit board, IC chip sealing material, electrically conductive paint, solder resist, adhesives for die bonding, adhesives for printing circuited board, and electrically conductive adhesives and the like in the electronic field; electrically insulating material, impregnation of coil, adhesives for battery casing, and adhesives for tape heads, and the like in the electrical field.

Also, when the particles of the present invention are used together with other polyaddition curing agents which are curable at high temperatures, such as dicyandiamide and acid anhydrides such as methylhexahydrophthalic anhydride, they can work effectively as a latent curing accelerator to efficiently lower the curing temperature.

The examples which follow are given for illustrative purposes and are not meant to limit the invention described herein.

In order to investigate the properties of the particles of curing agent obtained in the examples and comparative examples, the particles of curing agent were mixed with EPIKOTE® 828, which is an epoxy resin for general purposes, in such an amount as nearly the same amine concentration, and uniformly kneaded in a mortar to make an epoxy resin curing composition. Further, in order to investigate the properties of the particles of curing agent as the curing accelerator for high temperature curing agents, the particles of the invention were mixed with EPIKOTE® 828 and 8 phr of dicyandiamide or 85 phr of methylhexahydrophthalic anhydride to make an epoxy resin curing composition.

With respect to the epoxy resin curing compositions, the initial viscosity at 25° C., the curing time at each of the predetermined temperatures and the increase in viscosity after storage at 40° C. for one week are measured. Furthermore, a sample of each composition was heat-cured at 100° C. for one hour and then at 150° C. for three hours to form a cured product, and the glass transition temperature (Tg) and the water absorption in boiling water were measured. In addition, samples of some epoxy resin curing compositions were applied between two aluminum plates, and cured at 80° C. for 60 minutes and the tensile shear bonding strength was measured.

The measuring methods and the apparatus employed are as follows;

Volume Average Particle Size: Measured by an automatic particle size distribution analyzer of the ultracentrifuge type ("CAPA-700" manufactured by Horiba Seisakusho K.K.).

Viscosity: Measured by a B type viscometer. (manufactured by Tokyo Keiki Co., Ltd.)

Curing Time (minute): About 0.1 g of a sample was dropped on an aluminum plate and heat-cured in an air circulation oven maintained at a predetermined temperature. Then, the period of time necessary for giving a pencil hardness of H or more by the pencil hardness test at room temperature was measured.

Glass Transition Temperature (Tg): Measured by the penetration method with a thermal mechanical analyzer ("TMA" manufactured by Seiko Industries Inc.).

Water Absorption (%): A sample of about 40 mm in diameter and about 4mm in thickness was soaked in boiling water of 100° C. for one hour, and the increase in weight was measured and the water absorption was calculated from the following equation;

$$\text{water absorption (\%)} = \frac{\text{increase in weight after soaking in boiling water}}{\text{weight before soaking in boiling water}} \times 100$$

Tensile Shear Bonding Strength (kgf/cm$^2$): Measured in accordance with JIS-K6850

In the following Comparative Examples 1 to 6, amine compound/epoxy compound adducts were stoichiometrically synthesized without any modification reaction.

COMPARATIVE EXAMPLE 1

Xylene 600 g and 2-methylimidazole (hereinafter referred to as "2MZ" a product of Aldrich Chemical Co., Inc.) 300 g (3.654 equivalent) were charged in a 3,000 ml four-necked round bottom flask equipped with a thermometer, a reflux condenser, a dropping funnel and a steel propeller type agitator, and the temperature was raised to 120° C. with agitation to completely dissolve the 2MZ. Subsequently, while agitation was continued and the temperature was kept at 120° C., a solution prepared by dissolving 680 g (3.654 equivalent) of bisphenol A diglycidyl ether epoxy resin having an epoxy equivalent weight of 186 (hereinafter referred to as "EPIKOTE ® 828", a product of Yuka Shell Epoxy K.K.) in 300 g of xylene was added dropwise from the dropping funnel over a period of 90 minutes. The adduct which formed was insoluble in xylene and was precipitated as a viscous mass as the reaction progressed. The reaction was further continued for 2 hours to reach a conversion of at least about 98% and then, the temperature of the contents in the flask was lowered to room temperature. Agitation was stopped and the xylene in the upper layer was removed by decantation. Then, the remaining contents of the flask were heated to 140° C. to remove the remaining xylene by distillation under a reduced pressure of 10 mm Hg. The molten adduct was poured onto a shallow dish and cooled to room temperature to give reddish brown adduct mass. This product was crushed and repeatedly pulverized by a jet mill and finally classified to give fine yellow powder. The volume average particle size was 2.9 μm.

COMPARATIVE EXAMPLE 2

Methyl isobutyl ketone (hereinafter referred to as "MIBK") 325 g and 2-phenylimidazole (hereinafter referred to as "2PZ", a product of Wako Pure Chemical Industries, Ltd.) 162.5 g (0.4514 equivalent) were charged in a 1,000 ml four-necked round bottom flask equipped with a thermometer, a reflux condenser, a dropping funnel and a steel propeller type agitator, and the temperature was raised to 100° C. with agitation to completely dissolve the 2PZ. Subsequently, while agitation was continued and the temperature was kept at 100° C., a solution prepared by dissolving 195.2 g (0.4514 equivalent) of bisphenol A diglycidyl ether having an epoxy equivalent weight of 173 ("DER 332" a product of Dow Chemical Co., Ltd.) in 195 g of MIBK was added dropwise from the dropping funnel over a period of 60 minutes. The adduct which formed was insoluble in MIBK and was precipitated as a viscous mass as the reaction progressed. The reaction was further continued for 4 hours to reach a conversion of at least about 98% and then, the temperature of the contents in the flask was lowered to room temperature. Agitation was stopped and the MIBK in the upper layer was removed by decantation. Then, the remaining contents of the flask were heated at a temperature of from 100° C. to 140° C. to remove the remaining MIBK by distillation under reduced pressure of 10 mm Hg. The molten adduct was poured onto a shallow dish and cooled to room temperature to give brown adduct mass. This product was crushed, pulverized and classified in the same manner as in Comparative Example 1 to give fine yellow powder having a volume average particle size of 4.5 μm.

COMPARATIVE EXAMPLE 3

DER 332 276.8 g (1.60 equivalent) was charged in a 500 ml beaker equipped with a thermometer, a band heater and a steel propeller type agitator and heated by the band heater with agitation. When the temperature of the contents of the beaker reached a temperature of from 70° C. to 75° C., heating was stopped and 2-ethyl-4-methylimidazole (hereinafter referred to as "EMI-24" a product of Aldrich Chemical Co , Inc ) which is liquid at room temperature 176.3 g (1.60 equivalent) was added at one time and the contents in the beaker were uniformly mixed with agitation at a rate of 500 r.p.m. The temperature of the contents was lowered to about 60° C. once but soon generation of heat by the addition reaction was observed and the temperature rapidly rose to reach about 230° C. When the temperature of the contents in the beaker was gradually lowered with agitation to 140° C. the adduct which formed became a viscous mass and was poured onto a shallow dish and cooled to room temperature to give reddish brown adduct mass. This product was crushed, pulverized and classified in the same manner as in Comparative Example 1 to give fine yellow powder having a volume average particle size of 4.3 μm.

COMPARATIVE EXAMPLE 4

2MZ 28.0 g (0.34 equivalent) and a graft copolymer of poly [(styrene-co-glycidyl methacrylate)-g-methyl methacrylate](hereinafter referred to as "RESEDA ® GP-300" a product of Toagosei Chemical Ind. Co., Ltd.) 4.54 g as the dispersion stabilizer were charged in a 1,000 ml three-necked round bottom flask equipped with a thermometer, a reflux condenser and a halfmoon-shaped Teflon agitator, and MIBK 542.53 g was added thereto. Then, the temperature was raised to 70° C. to completely dissolve the mixture. Further, 125.60 g (0.34 equivalent) of a 50% MIBK solution of EPIKOTE 828 was added to the resulting solution and the reaction was carried out at 70° C. for 9 hours with agitation at a rate of 300 r.p.m. The reaction mixture solution which was initially clear and colorless gradually changed to milky white opaque liquid as the reaction progressed. In the final stage of the reaction, the reaction mixture solution became a milky white dispersion with creamy color.

When the reaction was carried out at 70° C. for 9 hours to reach a conversion of 100%, the reaction mixture was cooled to room temperature and spray-dried by means of a spray dryer designed for organic solvents (Model GS-31, manufactured by Yamato Kagaku K.K.) to recover the particles of curing agent. The conditions for spray-drying are as follows.

Temperature at the entrance to the drying chamber: 100° C.
Temperature at the exit from the drying chamber: 74° C.
Temperature at the exit from the condenser: 16° C.
Diameter of spray nozzle: 0.4 mm
Spray pressure: 1.2 kg/cm2
Flow rate of hot $N_2$ gas: 0.5 m3 min.
Liquid feeding rate 10 g/min.

By spray-drying, a nearly theoretical amount of the particles of curing agent was recovered as dried white powder. Examination by scanning electron microscopy has revealed that the particles of curing agent were recovered almost as primary particles. The volume average particle size of the particles of curing agent was 2.8 mm. The recovery rate of MIBK as the solvent was 99.2%.

COMPARATIVE EXAMPLE 5

2PZ 40.37 g (0.280 equivalent) and RESEDA ® GP-300 4.44 g were charged in the same flask as in Comparative Example 4, and MIBK 543.6 g was added thereto. Then, the temperature was raised to 70° C. to completely dissolve the mixture. Further, 96.88 g (0.280 equivalent) of a 50% MIBK solution of DER, 332 was added and the reaction was carried out at 70° C. for 15 hours with agitation at a rate of 300 r.p.m. The reaction mixture, which was initially clear and colorless, gradually changed into a milky white opaque liquid as the reaction progressed. In the final stage of the reaction, the reaction mixture became a cream-colored, uniform and stable dispersion. This dispersion of the particles of curing agent was transferred into a 2,000 ml beaker and about 500 ml of n-hexane was gradually added thereto with agitation to flocculate and precipitate particles. The particles were collected by filtration on a glass filter and dried in vacuum at 50° C. for 2 days to give cream-colored white powder in a yield of 95.5%. The volume average particle size of the particles of curing agent was 3.8 $\mu$m.

COMPARATIVE EXAMPLE 6

EMI-24 20.00 g (0.182 equivalent) and RESEDA ®GP-300 2.57 g were charged in the same flask as in Comparative Example 4, and MIBK 310.4 g was added thereto. Then, the temperature was raised to 70° C. to completely dissolve the mixture. Further, 62.83 g (0.182 equivalent) of a 50% MIBK solution of DER, 332 was added and the reaction was carried out at 70° C. for 15 hours with agitation at a rate of 300 r.p.m. The reaction mixture, which was initially yellow and clear, gradually changed to a yellowish brown opaque liquid as the reaction progressed. In the final stage of the reaction the reaction mixture solution became a yellowish brown uniform and stable dispersion. The dispersion of the particles of curing agent was subjected to flocculation and precipitation with n-hexane in the same manner as in Comparative Example 5 and the particles were collected by filtration on a glass filter and further dried at 45° C. for 2 days in vacuum to give yellow powder in a yield of 70.0%. The volume average particle size of the particles of curing agent was 4.1 $\mu$m.

COMPARATIVE EXAMPLE 7

2MZ 24.0 g and RESEDA ® GP-300 3.90 g were charged in a 1,000 ml four-necked round bottom flask equipped with a thermometer, a reflux condenser, a dropping funnel and a halfmoon-shaped agitator, and MIBK 465.03 g were added thereto and then the temperature was raised to 70° C. to completely dissolve the mixture. Subsequently, 107.66 g of a 50% MIBK solution of EPIKOTE ® 828 were added to the solution and the reaction was carried out at 70° C. for 9 hours with agitation at a rate of 300 r.p.m. To this reaction mixture, 49.04 g of a 10% MIBK solution of diphenylmethane-4,4'-diisocyanate (hereinafter referred to as "MDI", "MILLIONATE ® MT", a product of Nippon Polyurethurethane Industry Co., Ltd.) was gradually added dropwise from the dropping funnel with agitation at a rate of 300 r.p.m. After completion of the addition, the reaction was further carried out at 70° C. for 5 hours to reach a conversion of nearly 100%. In the final stage of the reaction, the reaction mixture became a slightly dark cream-colored, uniform and stable dispersion. The dispersion of the particles of curing agent was spray-dried under the same conditions as in Comparative Example 4 to quantitatively give dried white powder tinged with cream color. The volume average particle size of the particles of curing agent was 2.9 $\mu$m. In this example, the spherical particles of curing agent were prepared by using 6% by weight of MDI based on the total weight of the adduct. The polyfunctional isocyanate compound was added after completion of the reaction for forming the particles of the adduct.

EXAMPLE 1

2MZ 28.0 g and RESEDA ® GP-300 4.99 g were charged in the same flask as in Comparative Example 4 and MIBK 593.95 g was added thereto and then, the temperature was raised to 70° C. to completely dissolve the mixture. Subsequently, 143.74 g of a 50% MIBK solution of EPIKOTE, 828 was added thereto, and the reaction was carried out at 70° C. for 10 hours with agitation at a rate of 300 r.p.m. to reach a conversion of almost 100%. In the final stage of the reaction, the reaction mixture became a uniform and stable dispersion with nearly the same external appearance as that in Comparative Example 4. The dispersion of the particles of curing agent was spray-dried under the same conditions as Comparative Example 4 to quantitatively give dried white powder. The volume average particle size of the particles of curing agent was 2.8 $\mu$m.

In this example, the spherical particles of curing agent were prepared by the one-step process using 9% by weight excess of EPIKOTE ® 828 in the initial charging step, compared to Comparative Example 4.

EXAMPLE 2

2MZ 26.0 g and RESEDA ® GP-300 5.06 g were charged in the same flask as in Comparative Example 4 and MIBK 599.47 g was added thereto and then the temperature was raised to 70° C. to completely dissolve the mixture. Further, 150.40 g of a 50% MIBK solution of EPIKOTE ®828 was added to the solution and the reaction was carried out at 70° C. for 11 hours with agitation at a rate of 300 r.p.m. to reach a conversion of nearly 100%. In the final stage of the reaction, the reaction mixture became a uniform and stable dispersion with nearly the same external appearance as that in Comparative Example 4. The dispersion of the particles of curing agent was spray-dried under the same conditions as in Comparative Example 4 to quantitatively give dried white powder. The volume average particle size of the particles of curing agent was 2.9 μm.

In this example, the spherical particles of curing agent were prepared by the one-step process using 19% by weight excess of the polyfunctional epoxy compound in the initial charging step, compared to Comparative Example 4.

EXAMPLE 3

2MZ 23.0 g and RESEDA ® GP-300 4.95 g were charged in the same flask as in Comparative Example 4 and MIBK 584.17 g was added thereto and then the temperature was raised to 70° C. to completely dissolve the mixture. Further, 152.06 g of a 50% MIBK solution of EPIKOTE ®828 was added to the solution and the reaction was carried out at 70° C. for 12 hours with agitation at a rate of 300 r.p.m. to reach a conversion of nearly 100%. In the final stage of the reaction, the reaction mixture became a uniform and stable dispersion with nearly the external appearance as that in Comparative Example 4. The dispersion of the particles of curing agent was spray-dried under the same conditions as in Comparative Example 4 to quantitatively give dried white powder. The volume average particle size of the particles of curing agent was 3.0 μm.

In this example, the spherical particles of curing agent were prepared by the one-step process using 33% by weight excess of the polyfunctional epoxy compound in the initial charging stage, compared to Comparative Example 4.

EXAMPLE 4

2MZ 24.0 g and RESEDA ® GP-300 3.90 g were charged in the same flask as in Comparative Example 4 and MIBK 465.03 g was added thereto and then the temperature was raised to 70° C. to completely dissolve the mixture. Further, 107.66 g of a 50% MIBK solution of EPIKOTE ®828 were added to the solution and the reaction was carried out at 70° C. for 9 hours with agitation at a rate of 300 r.p.m. Then, 51.01 g of a 50% MIBK solution of EPIKOTE ® 828 and, in addition, 21.43 g of MIBK for washing were added, and the reaction was continued at 70° C. for 4 hours to reach a conversion of nearly 100%. In the final stage of the reaction, a uniform and stable dispersion was obtained which showed nearly the same external appearance as that in Comparative Example 4. The dispersion of the particles of curing agent was spray-dried under the same conditions as in Comparative Example 4 to quantitatively give dried white powder. The volume average particle size of the particles of curing agent was 3.0 μm.

In this example, the spherical particles of curing agent were prepared by the two-step process using 33% by weight excess of the polyfunctional epoxy compound, compared to Comparative Example 4. The polyfunctional epoxy compound was added after completion of the reaction for forming the particles of the adduct.

EXAMPLE 5

2PZ 40.37 g (0.280 equivalent) and RESEDA ® GP-300 4.44 g were charged in the same flask as in Comparative Example 4, and MIBK 543.6 g was added thereto. Then, the temperature was raised to 70° C. to completely dissolve the mixture. Further, 96.88 g (0.280 equivalent) of a 50% MIBK solution of DER ® 332 was added and the reaction was carried out at 70° C. for 18 hours with agitation at a rate of 300 r.p.m. The reaction mixture, which was initially clear and colorless, gradually changed into a milky white opaque liquid as the reaction progressed and finally became a cream-colored uniform and stable dispersion. Subsequently, 44.50 g of a 50% MIBK solution of EPIKOTE ® 828 and, in addition, 20.0 g of MIBK for washing were added to the dispersion and the reaction was further carried out at 70° C. for 6 hours. In the final stage of the reaction the reaction mixture became a cream-colored uniform and stable dispersion. The dispersion of the particles of curing agent thus prepared was subjected to flocculation and precipitation with n-hexane in the same manner as in Comparative Example 5 and the particles thus precipitated were collected by filtration on a glass filter and further dried at 50° C. for 2 days in vacuum to almost quantitatively give white powder tinged with cream color. The volume average particle size of the particles of curing agent was 4.1 μm.

In this example, the spherical particles of curing agent were prepared by the two-step process using 25% by weight excess of the polyfunctional epoxy compound, compared to Comparative Example 5. The polyfunctional epoxy compound was added after almost completing the reaction for forming the particles of the adduct.

EXAMPLE 6

EMI-24 20.00 g (0.182 equivalent) and RESEDA ®GP-300 2.57 g were charged in the same flask as in Comparative Example 4, and MIBK 310.4 g was added thereto. Then, the temperature was raised to 70° C. to completely dissolve the mixture. Further, 62.83 g (0,182 equivalent) of a 50% MIBK solution of DER ® 332 was added and the reaction was carried out at 70° C. for 15 hours with agitation at a rate of 300 r.p.m. The reaction mixture, which was initially yellow and colorless, gradually changed into a yellowish brown opaque liquid as the reaction progressed and became a yellowish brown uniform and stable dispersion in the final stage of the reaction. Subsequently, 31.42 g of a 50% MIBK solution of EPIKOTE ® 828 and, in addition, 20.0 g of MIBK for washing were added to the dispersion and the reaction was further carried out at 70° C. for 6 hours. In the final stage of the reaction, the reaction mixture became a dark cream-colored uniform and stable dispersion. The dispersion of the particles of curing agent was subjected to flocculation and precipitation with n-hexane in the same manner as in Comparative Example 5 and the particles were collected by filtration on a glass filter and further dried at 45° C. for 2 days in vacuum to give yellow powder in a yield of 87.1%. The volume average particle size of the resulting particles of curing agent thus obtained was 4.4 μm.

In this example, the spherical particles of curing agent were prepared by the two-step process using 31% by weight excess of the polyfunctional epoxy compound, compared to Comparative Example 6. The polyfunctional epoxy compound was added during the reaction for forming the particles of the adduct.

EXAMPLE 7

2MZ 24.0 g and RESEDA ® GP-300 3.90 g were charged in the same flask as in Comparative Example 7 and MIBK 465.03 g was added thereto and the temperature was raised to 70° C. to completely dissolve the mixture. Then, 107.66 g of a 50% MIBK solution of EPIKOTE ® 828 was added to the solution and the reaction was carried out at 70° C. for 9 hours with agitation at a rate of 300 r.p.m. Further, 13.16 g of a 50% MIBK solution of EPIKOTE ® 828 was added to the reaction mixture and the reaction was carried out at 70° C. for 4 hours to reach a conversion of about 100%. Then, 49.04 g of a 10% MIBK solution of MDI was gradually added dropwise from the dropping funnel. After completion of the addition, the reaction was further carried out at 70° C. for 5 hours. In the final stage of the reaction, the reaction mixture became a uniform and stable dispersion with nearly the same external appearance as that in Comparative Example 7. The dispersion of the particles of curing agent was spray-dried under the same conditions as in Comparative Example 4 to quantitatively give white powder tinged with cream color. The volume average particle size of the particles of curing agent was 3.0 μm.

In this example, the spherical particles of curing agent were prepared by the two-step process comprising using 8% by weight excess of the polyfunctional epoxy compound and reacting the resulting adduct with 6% by weight of the polyfunctional isocyanate compound.

COMPARATIVE EXAMPLE 8

MIBK 275 g and 2PZ 137.5 g (0.382 equivalent) were charged in the same flask as in Comparative Example 2, and the temperature was raised to 100° C. with agitation to completely dissolve the 2PZ. Subsequently, while agitation was continued and the temperature was kept at 100° C., 137.5 g of a 30% MIBK solution of 2-ethylhexanoic acid was added dropwise from the dropping funnel and after completion of the addition the reaction mixture solution was further agitated at 100° C. for 30 minutes. Subsequently, a solution prepared by dissolving 165.2 g (0.382 equivalent) of DER ® 322 in 165 g of MIBK was added dropwise from the dropping funnel to the reaction mixture at 100° C. over a period of 30 minutes. The adduct which formed was insoluble in MIBK and was precipitated as a viscous mass as the reaction progressed. The reaction was further continued for 4 hours to reach a conversion of at least about 98% and then, the temperature of the contents in the flask was lowered to room temperature. Agitation was stopped and the MIBK in the upper layer was removed by decantation. Then, the remaining contents of the flask were heated at a temperature of from 100° C. to 140° C. to remove the remaining MIBK by distillation under reduced pressure of 10 mm Hg. The molten adduct was poured onto a shallow dish and cooled to room temperature to give yellowish brown adduct mass. This product was crushed, pulverized and classified in the same manner as in Comparative Example 1 to give fine yellow powder having a volume average particle size of 5.2 μm.

In this example, the pulverized particles of curing agent were prepared by adding 14% by weight of the carboxylic acid before the synthesis of the amine compound/epoxy compound adduct.

COMPARATIVE EXAMPLE 9

DER 332 210.6 g (1.2173 equivalent) was charged in the same beaker as in Comparative Example 3 and heated by the band heater with agitation. When the temperature of the contents of the beaker reached a temperature of from 70° C. to 75° C., heating was stopped and EMI-24 89.4 g (0.8115 equivalent) was added at one time and the contents in the beaker were uniformly mixed with agitation at a rate of 400 r.p.m. The temperature of the contents was lowered to about 60° C. once but soon generation of heat by addition reaction was observed and the temperature rapidly rose to reach about 240° C. When the temperature of the contents in the beaker was gradually lowered with agitation to 170° C., the mixture became a viscous mass and was poured onto a shallow dish and cooled to room temperature to give yellowish brown adduct mass. This product was crushed, pulverized in the same manner as in Comparative Example 1 to give fine yellow powder having a volume average particle size of 5.4 μm.

In this example, the pulverized particles of curing agent were prepared by the one-step process using 31% by weight excess of the polyfunctional epoxy compound.

COMPARATIVE EXAMPLE 10

DER ® 332 210.6 g (1.2173 equivalent) was charged in the same beaker as in Comparative Example 3 and heated by the band heater with agitation. When the temperature of the contents of the beaker reached a temperature of from 70° C. to 75° C., heating was stopped and EMI-24 89.4 g (0.8115 equivalent) was added at one time and the contents in the beaker were uniformly mixed with agitation at a rate of 400 r.p.m. The temperature of the contents was lowered to about 60° C. once but soon generation of heat by addition reaction was observed and the temperature rapidly rose to reach about 240° C. When the temperature of the contents in the flask was gradually lowered with agitation to 190° C. 46.8 g of 2-ethylhexanoic acid was gradually added dropwise using a pipette, and the adduct which formed became a viscous mass at 140° C. and was poured onto a shallow dish and cooled to room temperature to give yellowish brown adduct mass. This product was crushed, pulverized and classified in the same manner as in Comparative Example 1 to give fine yellow powder having a volume average particle size of 5.8 μm.

In this example, the pulverized particles of curing agent were prepared by the one-step process using 31% by weight excess of the polyfunctional epoxy compound and then the reaction of the resulting adduct with 20% by weight of the carboxylic acid after the synthesis.

COMPARATIVE EXAMPLE 11

2MZ 24.0 g (0.29 equivalent) and RESEDA ® GP-300 3.90 g were charged in the same flask as in Comparative Example 7 and MIBK 465.03 g was added thereto and the temperature was raised to 70° C. to completely dissolve the mixture. Then, 107.66 g (0.29 equivalent) of a 50% MIBK solution of EPIKOTE ® 828 was added to the solution and the reaction was carried out at 70° C. for 9 hours with agitation at a rate of 300 r.p.m. Then, 51.01 g of a 50% MIBK solution of EPIKOTE ® 828 and, in addition, 21.43 g of MIBK for washing were added and the reaction was carried out at 70° C. for 4 hours. Then, 35.77 g of a 30% MIBK solution of 2-ethylhexanoic acid were slowly added dropwise from the dropping funnel. After completion of the addition, the reaction was carried out at 70° C. for 3 hours. In the final stage of the reaction, the reaction mixture increased its whiteness as compared to that in Comparative Example 4 and became a uniform and stable dispersion. The dispersion of the particles of curing agent was subjected to flocculation and precipitation with n-hexane in the same manner as in Comparative Example 5 and the particles were collected by filtration on a glass filter and further dried at 40° C. for 2 days in vacuum to give white powder. The volume average particle size of the particles of curing agent was 3.0 μm.

In the above described reaction the particles of curing agent were prepared by reacting the amine compound/epoxy compound adduct with 33% by weight excess of the polyfunctional epoxy compound by the two-step process and then reacting the resulting adduct with the carboxylic acid in an amount of 14% by weight based on the weight of the adduct.

COMPARATIVE EXAMPLE 12

2PZ 40.37 g (0.280 equivalent) and RESEDA® GP-300 4.44 g were charged in the same flask as in Comparative Example 7 and MIBK 543.6 g was added thereto and the temperature was raised at 70° C. to completely dissolved the mixture. Then, 40.37 g of a 30% MIBK solution of isobutyric acid was added dropwise from the dropping funnel. After completion of the addition, agitation was continued at 70° C. for 30 minutes. To the reaction mixture 96.88 g (0.280 equivalent) of a 50% MIBK solution of DER ® 332 was added and the reaction was carried out at 70° C. for 18 hours. The reaction mixture, which was initially clear and colorless, changed into a milky white opaque liquid as the reaction progressed and became a cream-colored uniform and stable dispersion. To the dispersion 44.50 g of a 50% MIBK solution of EPIKOTE ®828 and, in addition, 20.0 g of MIBK for washing were added and the reaction was further carried out at 70° C. for 5 hours. In the final stage of the reaction, the reaction mixture became a milky white uniform and stable dispersion tinged with cream color.

The dispersion of the particles of curing agent was subjected to flocculation and precipitation with n-hexane in the same manner as in Comparative Example 5 and the particles were collected by filtration on a glass filter and further dried at 45° C. for 2 days in vacuum to give white powder. The volume average particle size of the particles of curing agent was 4.2μm.

In the above described reaction the particles of curing agent were prepared by reacting the amine compound/epoxy compound adduct with 25% by weight excess of the polyfunctional epoxy compound by the two-step process. The carboxylic acid in an amount of 14% by weight based on the weight of the adduct was added before the synthesis of the adduct.

EXAMPLE 8

In the same flask as in Comparative Example 7 was charged 80.0 g of the fine powder as obtained in Comparative Example 1, and 530.0 g of cyclohexane and 6.0 g of a 40% toluene solution of a quaternized amine-modified polyester (hereinafter referred to as "HYPERMER ® LP8", a product of I.C.I. Ltd.) as the dispersion stabilizer were added thereto. Then, while the mixture was agitated at a rate of 400 r.p.m., the temperature was raised to 60° C. to form a uniform dispersion. To the dispersion 52.50 g of a 50% MIBK solution of EPIKOTE ® 828 was added dropwise from the dropping funnel over a period of 60 minutes and after completion of the addition, the reaction was further carried out at 60° C. for 8 hours. Then, 36.80 g of a 30% cyclohexane solution of 2-ethylhexanoic acid was gradually added dropwise from the dropping funnel and after completion of the addition, the reaction was carried out at 60° C. for 4 hours. Finally, 82.70 g of a 10% cyclohexane solution of MDI was added dropwise from the dropping funnel over a period of 120 minutes. After completion of the addition, the reaction was further carried out at 60° C. for 20 hours to reach a conversion of about 100%. In the final stage of the reaction, the reaction mixture became a uniform dispersion tinged with cream color. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 3.2 μm.

In this example, the pulverized particles of the amine compound/epoxy compound adduct as obtained in Comparative Example 1 were subjected to the reaction with 33% by weight excess of the polyfunctional epoxy compound by the two-step process, followed by the reaction with 14% by weight of the carboxylic acid and finally the reaction of the resultant with 10% by weight of polyfunctional isocyanate compound.

EXAMPLE 9

In the same flask as in Comparative Example 7 was charged 80.0 g of the fine powder as obtained in Comparative Example 2, and 530.0 g of cyclohexane and 6.0 g of a 40% toluene solution of HYPERMER ® LP8 as the dispersion stabilizer were added thereto. Then, while the mixture was agitated at a rate of 400 r.p.m., the temperature was raised to 50° C. to form a uniform dispersion. To the dispersion 36.34 g of a 30% cyclohexane solution of 2-ethylhexanoic acid was gradually added dropwise from the dropping funnel and after completion of the addition, the reaction was further carried out at 50° C. for 5 hours. Then, 40.0 g of a 50% MIBK solution of EPIKOTE ® 828 was added dropwise to the reaction mixture from the dropping funnel over a period of 60 minutes and after completion of the addition, the reaction was further carried out at 50° C. for 15 hours. Subsequently, the temperature of the reaction mixture solution was raised to 60° C. and 88.0 g of a 10% cyclohexane solution of MDI was added dropwise from the dropping funnel over a period of 120 minutes. After completion of the addition, the reaction was further carried out at 60° C. for 20 hours to reach a conversion of about 100%. In the final stage of the reaction, the reaction mixture became a yellowish brown uniform dispersion. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 4.9 μm.

In this example, the pulverized particles of the amine compound/epoxy compound adduct as obtained in Comparative Example 2 were subjected to the reaction with 14% by weight of the carboxylic acid after the re-dispersion in an organic solvent, followed by the reaction with 25% by weight of the polyfunctional epoxy compound and finally the reaction of the resultant with 11% by weight of the polyfunctional isocyanate compound.

EXAMPLE 10

In the same flask as in Comparative Example 7 was charged 90.9 g of the fine yellow powder as obtained in Comparative Example 8, and 600.0 g of cyclohexane and 6.8 g of a 40% toluene solution of HYPERMER® LP8 as the dispersion stabilizer were added thereto. Then, while the mixture was agitated at a rate of 400 r.p.m., the temperature was raised to 50° C. to form a uniform dispersion. To the dispersion 40.0 g of a 50% MIBK solution of EPIKOTE® 828 was added dropwise from the dropping funnel over a period of 60 minutes. After completion of the addition, the reaction was further carried out at 50° C. for 15 hours. Then, the temperature of the reaction mixture was raised to 60° C. and 88.0 g of a 10% cyclohexane solution of MDI was added dropwise from the dropping funnel over a period of 120 minutes. After completion of the addition, the reaction was further carried out at 60° C. for 20 hours to reach a conversion of about 100%. In the final stage of the reaction, the reaction mixture became a yellowish brown uniform dispersion. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 5.4 μm.

In this example, the pulverized particles of curing agent were prepared by adding 14% by weight of the carboxylic acid before the synthesis of the amine compound/epoxy compound adduct, reacting the resulting adduct with 25% by weight of the polyfunctional epoxy compound after the pulverization and the re-dispersion in an organic solvent, and finally reacting the resultant with 11% by weight of the polyfunctional isocyanate compound.

EXAMPLE 11

MIBK 275 g and 2PZ 137.5 g (0.382 equivalent) were charged in the same flask as in Comparative Example 2, and the temperature was raised to 100° C. with agitation to completely dissolve the 2PZ. Subsequently, while agitation was continued and the temperature was kept at 100° C., a solution prepared by dissolving 165.2 g (0,382 equivalent) of DER* 332 in 165 g of MIBK was added dropwise from the dropping funnel over a period of 30 minutes. The adduct which formed was insoluble in MIBK and was precipitated as a viscous mass as the reaction progressed. The reaction was further continued at 100° C. for 4 hours to reach a conversion of at least about 98% and then, to the reaction mixture 41.3 g of 2-ethylhexanoic acid was added dropwise from the dropping funnel. After completion of the addition, the reaction mixture was further agitated at 100° C. for 3 hours and then, the temperature of the contents in the flask was lowered to room temperature. Agitation was stopped and the MIBK in the upper layer was removed by decantation. Then, the remaining contents of the flask were heated at a temperature of from 100° C. to 140° C. to remove the remaining MIBK by distillation under a reduced pressure of 10 mm Hg. The molten adduct was poured onto a shallow dish and cooled to room temperature to give a yellowish brown adduct mass. This product was crushed, pulverized and classified in the same manner as in Comparative Example 1 to give fine yellow powder having a volume average particle size of 4.6 μm.

Subsequently, in the same flask as in Comparative Example 7, 90.9 g of the fine yellow powder as obtained above was changed, and 600 g of cyclohexane and 6.8 g of HYPERMER® LP8 as the dispersion stabilizer were added thereto. Then, while the mixture was agitated at a rate of 400 r.p.m., the temperature was raised to 50° C. to form a uniform dispersion. To the dispersion 40.0 g of a 50% MIBK solution of EPIKOTE® 828 was added dropwise over a period of 60 minutes. After completion of the addition, the reaction was further carried out at 50° C. for 15 hours. After the temperature of the reaction mixture was raised to 60° C., 88.0 g of a 10% cyclohexane solution of MDI was added dropwise from the dropping funnel over a period of 120 minutes. After completion of the addition, the reaction was further carried out at 60° C. for 20 hours to reach a conversion of about 100%. In the final stage of the reaction, the reaction mixture became a yellowish brown uniform dispersion. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 4.8 μm.

In this example, the pulverized particles of curing agent were prepared by adding 14% by weight of the carboxylic acid after the synthesis of the amine compound/epoxy compound adduct, reacting the adduct with 25% by weight of the polyfunctional epoxy compound after the removal of the solvent, pulverization and the re-dispersion in an organic solvent, and finally reacting the resultant with 11% by weight of the polyfunctional isocyanate compound.

EXAMPLE 12

In the same flask as in Comparative Example 7 there was charged 100.0 g of the fine powder as obtained in Comparative Example 10, and 650.0 g of n-hexane was added thereto and then, while the mixture was agitated at a rate of 500 r.p.m., the temperature was raised to 40° C. to completely disperse the fine powder in n-hexane. To the dispersion 69.0 g of a 10% n-hexane solution of MDI was added dropwise from the dropping funnel over a period of 4 hours. After completion of the addition, the reaction was further carried out at 40° C. for 24 hours to reach a conversion of about 100%. In the final stage of the reaction, the reaction mixture became a yellowish brown uniform dispersion. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 5.5 μm.

In this example, the pulverized particles of curing agent were prepared by reacting the amine compound/epoxy compound adduct with 31% by weight excess of the polyfunctional epoxy compound by the one-step process, reacting the resulting adduct with 20% by weight of the carboxylic acid after the synthesis of the adduct, and finally reacting the resultant with 10% by weight of the polyfunctional isocyanate compound.

EXAMPLE 13

In the same flask as in Comparative Example 7, 86.5 g of the fine powder as obtained in Comparative Example 9 was charged, and 580.0 g of n-hexane was added thereto. While the mixture was agitated at a rate of 500 r.p.m., the temperature was raised to 40° C. to form a uniform dispersion. To the dispersion 45.0 g of a 30% n-hexane solution of 2-ethylhexanoic acid was gradually added dropwise from the dropping funnel and after completion of the addition, the reaction was further carried out at 40° C. for 5 hours. Then, 69.0 g of a 10% cyclohexane solution of MDI was gradually added dropwise from the dropping funnel over a period of 4 hours. After completion of the addition, the reaction was further carried out at 40° C. for 24 hours to reach a conversion of about 100%. In the final stage of the reaction, the reaction mixture became a yellowish brown uniform dispersion. The dispersion of the particles of curing agent was transferred into a 2,000 ml beaker and left to stand overnight to precipitate particles. The particles were recovered by filtration on a glass filter and further dried in vacuum at 45° C. for 2 days to give yellowish particles. The volume average size of the particles of curing agent was 5.8 μm.

In this example, the pulverized particles of curing agent were prepared by reacting the amine compound/epoxy compound adduct with a 31% excess of the polyfunctional epoxy compound by the one-step process, reacting the resulting adduct with 20% by weight of the carboxylic acid after the pulverization, re-dispersing in an organic solvent and finally reacting the resultant with 10% of the polyfunctional isocyanate compound.

EXAMPLE 14

2MZ 24.0 g (0.29 equivalent) and RESEDA ® GP-300 3.90 g were charged in the same flask as in Comparative Example 7 and MIBK 465.03 g was added thereto. Then, the temperature was raised to 70° C. to completely dissolve the mixture. Further, 107.66 g (0.29 equivalent) of a 50% MIBK solution of EPIKOTE ®828 was added to the solution and the reaction was carried out at 70° C. for 9 hours with agitation at a rate of 300 r.p.m. Then, 51.01 g of a 50% MIBK solution of EPIKOTE ® 828 and, in addition, 21.43 g of MIBK for washing were added and the reaction was carried out at 70° C. for 4 hours. To the reaction mixture 35.77 g of a 30% MIBK solution of 2-ethylhexanoic acid was gradually added dropwise from dropping funnel. After completion of the addition, the reaction was further carried out at 70° C. for 3 hours. Finally, 64.34 g of a 10% MIBK solution of MDI was added dropwise from a dropping funnel over a period of 40 minutes. After completion of the addition, the reaction was further carried out at 70° C. for 8 hours to reach a conversion of nearly 100%. In the final stage of the reaction, the reaction mixture became a milky white uniform and stable dispersion tinged with cream color. The dispersion of the particles of curing agent was subjected to flocculation and precipitation with n-hexane in the same manner as in Comparative Example 5 and the precipitated particles were recovered by filtration on a glass filter and further dried in vacuum to nearly quantitatively give dried white powder. The volume average particle size of the particles of curing agent was 3.1 μm.

In the above described reaction the spherical particles of curing agent were prepared by reacting the amine compound/epoxy compound adduct with 33% by weight excess of the polyfunctional epoxy compound, reacting the resulting adduct with 14% by weight of the carboxylic acid and finally reacting the adduct with 8% by weight of the polyfunctional isocyanate compound.

EXAMPLE 15

2MZ 24.0 g and RESEDA ® GP-300 3.90 g were charged in the same flask as in Comparative Example 7 and MIBK 465.03 g was added thereto. Then, the temperature was raised to 70° C. to completely dissolve the mixture and 107.66 g of a 50% MIBK solution of EPIKOTE ® 828 was added to the solution, and the reaction was carried out at 70° C. for 9 hours with agitation at a rate of 300 r.p.m. Subsequently, 51.01 g of a 50% MIBK solution of EPIKOTE ® 828 and, in addition, 21.43 g of MIBK for washing were added and the reaction was further carried out at 70° C. for 4 hours. Then, 71.50 g of a 30% MIBK solution of 2-ethylhexanoic acid was gradually added to the reaction solution dropwise from the dropping funnel. After completion of the addition, the reaction was carried out at 70° C. for 3 hours. Finally, 85.80 g of a 10% MIBK solution of MDI was added dropwise from the dropping funnel over a period of 60 minutes. After completion of the addition, the reaction was further carried out at 70° C. for 9 hours to reach a conversion of nearly 100%. In the final stage of the reaction, the reaction mixture became a uniform and stable dispersion with nearly the same external appearance as in Example 14. The dispersion was subjected to flocculation and precipitation with n-hexane in the same manner as in Comparative Example 5 and the particles were recovered by filtration on a glass filter and further dried in vacuum to nearly quantitatively give dried white powder. The volume average particle size of the particles of curing agent was 3.2 μm.

In the above described reaction the spherical particles of curing agent were prepared by reacting the amine compound/epoxy compound adduct with 33% by weight excess of the polyfunctional epoxy compound, reacting the resulting adduct with 28% by weight of the carboxylic acid and further reacting the adduct with 11% by weight of the polyfunctional isocyanate compound.

EXAMPLE 16

2MZ 24.0 g (0.292 equivalent) and RESEDA ® GP-300 3.90 g were charged in the same flask as in Example 7 and MIBK 528.52 g was added thereto. Then, the temperature was raised to 70° C. to completely dissolve the mixture and 158.67 g (0.427 equivalent) of a 50% MIBK solution of EPIKOTE ® 828 was added to the solution, and the reaction was carried out at 70° C. for 10 hours with agitation at a rate of 300 r.p.m. Then, 71.50 g of a 30% MIBK solution of 2-ethylhexanoic acid was gradually added dropwise to the reaction mixture from the dropping funnel. After completion of the addition, the reaction was further carried out at 70° C. for 3 hours. Finally, 85.80 g of a 10% MIBK solution of MDI was added dropwise from the dropping funnel over a period of 60 minutes. After completion of the addition, the reaction was carried out at 70° C. for 9 hours to reach a conversion of nearly 100%. In the final stage of the reaction, a uniform and stable dispersion was obtained with nearly the same external appearance as in Example 15. The dispersion of the particles of curing agent was subjected to flocculation and precipitation with n-hexane in the same manner as in Comparative Example 5, and the particles were recovered by filtration on a glass filter and dried in vacuum to give nearly quantitatively dried white powder. The volume average particle size of the particles of curing agent was 3.2 μm.

In this example, the spherical particles of curing agent were prepared by reacting the amine compound-/epoxy compound adduct with 33% by weight excess of the polyfunctional epoxy compound by the one-step process, reacting the resulting adduct with 28% by weight of the carboxylic acid and finally reacting the resultant with 11% by weight of the polyfunctional isocyanate compound.

EXAMPLE 17

2MZ 24.0 g and RESEDA® GP-300 3.90 g were charged in the same flask as in Comparative Example 7 and MIBK 465.03 g was added thereto and the temperature was raised to 70° C. to completely dissolve the mixture. Then, 107.66 g of a 50% MIBK solution of EPIKOTE® 828 was added to the solution and the reaction was carried out at 70° C. for 9 hours with agitation at a rate of 300 r.p.m. Then, 51.01 g of a 50% MIBK solution of EPIKOTE® 828 and, in addition, 21.43 g of MIBK for washing were added and the reaction was further carried out at 70° C. for 4 hours. Then, 142.97 g of a 30% MIBK solution of 2-ethylhexanoic acid was gradually added dropwise from the dropping funnel. After completion of the addition, the reaction was carried out at 70° C. for 3 hours. Finally, 107.20 g of a 10% MIBK solution of polymethylene polyphenylisocyanate ("MILLIONATE MR-300" a product of Nippon Polyurethane Industry Co., Ltd.) was added dropwise from the dropping funnel over a period of 2 hours. After completion of the addition, the reaction was further continued at 70° C. for 10 hours to reach a conversion of nearly 100%. In the final stage of the reaction, a uniform and stable dispersion with nearly the same external appearance as in Example 14 was obtained. The dispersion was subjected to flocculation and precipitation with n-hexane in the same manner as in Comparative Example 5, and the particles were recovered by filtration on a glass filter and dried in vacuum to nearly quantitatively give dried white powder. The volume average particle size of the particles of curing agent thus obtained was 3.3 μm.

In the above described reaction the spherical particles of curing agent were prepared by reacting the amine compound/epoxy compound adduct with 33% by weight excess of the polyfunctional epoxy compound, reacting the resulting adduct with 55% by weight of the carboxylic acid and further reacting the resulting adduct with 14% by weight of the polyfunctional isocyanate compound.

EXAMPLE 18

2PZ 40.37 g (0.280 equivalent) and RESEDA® GP-300 4.44 g were charged in the same flask as in Comparative Example 7 and MIBK 543.6 g was added thereto. Then, the temperature was raised to 70° C. to completely dissolve the mixture. Further, 40.37 g of a 30% MIBK solution of isobutyric acid was added dropwise to the solution from the dropping funnel. After completion of the addition the reaction was carried out at 70° C. for 30 minutes with agitation. Then, 96.88 g (0.280 equivalent) of a 50% MIBK solution of DER® 332 was added to the reaction mixture solution and the reaction was carried out at 70° C. for 18 hours with agitation at a rate of 300 r.p.m. Further, 44.50 g of a 50% MIBK solution of EPIKOTE®828 and, in addition, 20.0 g of MIBK for washing were added to the reaction mixture solution thus obtained and the reaction was further carried out at 70° C. for 5 hours. Finally, to the reaction mixture 88.81 g of a 10% MIBK solution of a mixture of 2,6-tolylene diisocyanate and 2,4-tolylene diisocyanate at a mole ratio of 5:95 (hereinafter referred to as "TDI", "CORONATE® T-100", a product of Nippon Polyurethane Industry Co., Ltd.) was added dropwise from dropping funnel over a period of 60 minutes. After completion of the addition, the reaction was further carried out at 70° C. for 10 hours to reach a conversion of nearly 100%. In the final stage of the reaction, the reaction mixture became a milky white uniform and stable dispersion tinged with cream color. The dispersion was subjected to flocculation and precipitation with n-hexane in the same manner as in Comparative Example 5 and the particles were recovered by filtration on a glass filter and further dried at 45° C. for 2 days in vacuum to nearly quantitatively give white powder tinged with cream color. The volume average particle size of the particles of curing agent thus obtained was 4.3 μm.

In this example, the spherical particles of curing agent were prepared by adding 14% by weight of the carboxylic acid before the synthesis of the amine compound/epoxy compound adduct and followed by the reaction of the resultant with 25% by weight of the polyfunctional epoxy compound and finally the reaction of the resultant with 10% by weight of the polyfunctional isocyanate compound.

EXAMPLE 19

2PZ 40.37 (0.280 equivalent) and RESEDA® GP-300 4.44 g were charged in the same flask as in Comparative Example 7 and MIBK 543.6 g was added thereto. Then, the temperature was raised to 70° C. to completely dissolve the mixture. Further, 96.88 g (0.280 equivalent) of a 50% MIBK solution of DER® 332 was added to the solution with agitation and the reaction was carried out at 70° C. for 18 hours with agitation at a rate of 300 r.p.m. To the reaction mixture 40.37 g of a 30% MIBK solution of isobutyric acid was gradually added dropwise from dropping funnel. After completion of the addition, the reaction was further carried out at 70° C. for 3 hours. Then, 44.50 g of a 50% MIBK solution of EPIKOTE® 828 and, in addition, 20.0 g of MIBK for washing were added to the reaction mixture solution and the reaction was further carried out at 70° C. for 5 hours. Finally, 88.81 g of a 10% MIBK solution of TDI was added dropwise from a dropping funnel over a period of 60 minutes. After completion of the addition, the reaction was further carried out at 70° C. for 10 hours to reach a conversion of nearly 100%. In the final stage of the reaction, the reaction mixture became a uniform and stable dispersion with nearly the same external appearance as that in Example 18. The dispersion was subjected to flocculation and precipitation with n-hexane in the same manner as in Comparative Example 5 and the particles were recovered by filtration on a glass filter and further dried at 45° C. for 2 days to nearly quantitatively give white powder tinged with cream color. The volume average particle size of the particles of curing agent thus obtained was 4.3 μm.

In this example, the spherical particles of curing agent were prepared by adding 14% by weight of the carboxylic acid after the synthesis of the amine compound/epoxy compound adduct and followed by the reaction of the resultant with 25% by weight of the polyfunctional epoxy compound and finally the reaction of the resultant with 10% by weight of the polyfunctional isocyanate compound.

The properties of an embodiment of the present invention, when an excess amount of a polyfunctional epoxy compound was used to make the adduct, are shown in Tables 1 and 2. Also, the properties of a second embodiment of the present invention, using an excess amount of the polyfunctional epoxy compound, are shown in Table 3. In these Tables the conditions for preparing the particles of curing agent, the results and the properties of the particles obtained as curing agents for epoxy resin are shown. Also, the properties of the particles when used as the curing accelerators for DICY and MHHPA are shown in Table 4.

As is clear from Table 1, the epoxy resin curing compositions prepared by using the pulverized particles of the adduct which was stoichiometrically synthesized by (a) the conventional solution addition reaction as in Comparative Examples 1 and 2, (b) the conventional bulk addition reaction as in Comparative Example 3 or the spherical particles of adduct stoichiometrically synthesized by the precipitation or dispersion addition reaction as in Comparative Examples 4, 5 and 6 could be quickly cured at a temperature of 100° C. or 120° C. to give cured products having good cured properties independent of the shape or form of the particles of curing agent. However, the storage stabilities of these epoxy resin curing compositions were extremely inferior. With the pulverized particles of curing agent as in Comparative Examples 1 to 3, the epoxy resin curing compositions were gelled at 40° C. after only one day and with the spherical particles of curing agent as in Comparative Examples 5 and 6 the epoxy resin curing compositions were gelled at 40° C. after two days.

In contrast, as is clear from Table 2, the epoxy resin curing compositions prepared by using the particles of curing agent obtained by reacting an excess amount of the polyfunctional epoxy compound in the preparation of the adduct i.e., by the one-step process where excess amount of the polyfunctional epoxy compound is added at the beginning of the precipitation or dispersion addition reaction of the amine compound with the epoxy compound as in Examples 1 to 3 and by the two-step process where an excess amount of the polyfunctional epoxy compound is added during or after completion of the precipitation or dispersion addition reaction for forming the amine compound/epoxy compound adduct as in Examples 4 to 6, show almost the same good curing properties and physical properties of the cured product at a usual curing temperature of 120° C. to 150° C. as those in Comparative Examples 1 to 6 but much more improved storage stabilities than those in Comparative Examples 1 to 6, if the concentration of the amine compounds are the same. A. Farkas and P. F. Stroehm, J. Appl. Polym. Sci., 12, 159 (1968) and J. M. Barton and P. M. Shepherd, Makromol. Chem., 176, 919 (1975) show that in the curing reaction of epoxy resin with an amine compound the addition reaction occurs prior to the polymerization reaction. Thus, it could be considered that first, particles of the adduct are previously formed, and an encapsulating layer of polymerized epoxy resin is formed on the surfaces of the resulting particles by addition of excess amount of the polyfunctional epoxy compound in any step of the particle formation of the adduct of the present invention, and that this encapsulating layer would contribute to the improvement of the latency of curing agent. It can be observed in Examples 1 to 3 that increased amounts of the polyfunctional epoxy compounds are more effective to improve the latency. Further, larger excess amounts of the polyfunctional epoxy compounds decrease the curability at 100° C. or lower to some extent, but improve the storage stability at 40° C. and at room temperature remarkably, and also the latency as can be seen in Examples 3 to 6. The particle size (i.e., volume average particle size) of the particles of curing agent obtained is slightly increased with increased amounts of the polyfunctional epoxy compounds and the yields of the particles hardly change and are about 100%. The reactivity of the particles of curing agent obtained by the one-step process where an excess amount of the polyfunctional epoxy compounds is added at the feeding stage is comparatively lower as in Example 3 where the gel time of the formulated epoxy resin is 122 seconds at 100° C. than that of the particles of curing agent obtained by the two-step process where first, the amine compound and the epoxy compound are stoichiometrically reacted to form an adduct and second, the adduct is further reacted with excess amount of the polyfunctional epoxy compound as in Example 4 where the gel time of the formulated epoxy resin is 105 seconds at 100° C. Thus, the reactivity of the particles of curing agent slightly depends on the reaction mode.

This embodiment of the present invention can be applied to the preparation of pulverized particles of curing agent in addition to the preparation of the spherical particles of curing agent, and in the pulverized case, the excess addition of the polyfunctional epoxy compound by the two-step process gives a favorable result.

As shown in Table 3, the second embodiment of the present invention, where the amine compound/epoxy compound adduct is reacted with a polyfunctional isocyanate compound, can quickly cure an epoxy resin at the usual curing temperature of 120° C. to 150° C., to give a cured product having excellent cured properties and to greatly improve the storage stability of the epoxy resin curing composition. More specifically, by comparing (a) the particles of curing agent of the adduct itself as in Comparative Example 4, (b) such particles further reacted only with a polyfunctional isocyanate compound as in Comparative Example 7 and (c) the particles of curing agent of the adduct reacted only with excess amount of a polyfunctional epoxy compound whose amount was nearly equal to the polyfunctional isocyanate compound as in Example 1 of Table 1 with (d) the particles of curing agent of the adduct reacted firstly with excess amount of a polyfunctional epoxy compound and secondly with a polyfunctional isocyanate compound as in Example 7, the above described effects would be clear. The epoxy resin curing composition containing the above described particles of curing agent (d) hardly increases its viscosity at 40° C. for one week and can be found usable even when stored at room temperature for one year.

The particles of curing agents as obtained in Examples 3 to 7 and Comparative Examples 4 to 7 were used as the curing accelerators for high temperature curing agents such as DICY and MHHPA, and the properties of the epoxy resin curing compositions and the cured products are shown in Table 4. The curing temperature could be lowered to 100° C. and, in addition, the curing compositions could be cured at 100° C. for a short period of time such as from 15 to 20 minutes. Furthermore, even when the epoxy resin curing compositions were stored at 40° C. for one week, the increase in viscosity was minimal, and the cured products showed good cured properties.

The third embodiment of the present invention, where a carboxylic acid was reacted with the adduct which had been made with an excess amount of the polyfunctional epoxy compound added before the reaction with a polyfunctional isocyanate compound. The effects of this reaction with the carboxylic acid are shown in Tables 5 to 12. The conditions for the preparation of the pulverized particles of curing agent by the conventional addition reaction as in Examples 8 to 11 and the bulk addition reaction as in Examples 12 and 13 and the spherical particles of curing agent by the precipitation or dispersion addition reaction in an organic solvent as in Examples 14 to 19, the results and the properties as the curing agents are shown in Tables 5 and 6 together with those of Comparative Examples 1 to 2, 4 to 5 and 8 to 12. Furthermore, the properties of the particles of curing agent when used as the curing accelerators for high temperature curing agents such as DICY and MHHPA are shown in Tables 7 to 10.

As will be understood from the results of Comparative Example 1 and Comparative Example 2 shown in Table 5 and the results of Comparative Example 4 and Comparative Example 5 shown in Table 6, the particles of curing agent of the stoichiometrically prepared amine compound/epoxy compound adduct have good curability at a low temperature of from 80° C. to 100° C. independent of the reaction mode for the preparation of the particles but their latency was not enough. Further, the latency of the particles of curing agent obtained by reacting the amine compounds with an excess amount of the polyfunctional epoxy compounds having been added during the precipitation or dispersion addition reaction was considerably improved as in Example 4 and 5 in Table 6 but their curabilities at 80° C. were unfavorably affected. The same could be observed as in Example 7 in Table 3 with the particles of curing agent obtained by reacting the polyfunctional isocyanate compound with the reaction product of the amine compound with excess amount of the polyfunctional epoxy resin having been added during the precipitation or dispersion addition reaction.

The reaction of the carboxylic acid with the amine compound/epoxy compound adduct remarkably increases the reactivity at low temperatures of the resulting reaction product. This effect may be due to the complex formation of the tertiary amino group of the adduct with the carboxylic acid to result in the reduction of the melting point of the adduct. For example, the melting point of the stoichiometrically reacted 2PZ/DER 332 adduct as in Comparative Example 2 is about 82° C. by the differential scanning calorimetry (hereinafter referred to as "DSC") while that of the adduct further reacted with 14% by weight of 2-ethylhexanoic acid as in Comparative Example 8 is lowered to about 55° C. This effect can be observed with other amine compound/epoxy compound adducts reacted with other carboxylic acids. Thus, when this effect is imparted to the particles of curing agent by reacting with a carboxylic acid as in Comparative Examples 8 and 10 in Table 5 and Comparative Examples 11 and 12 in Table 6, the epoxy resin curing compositions containing such particles of curing agent can avoid the decreased curability at low temperatures but will lose the improved latency due to their high reactivity.

Thus, when the amine compound and the epoxy compound are stoichiometrically reacted, or when the particles of the adduct obtained by the stoichiometric reaction are reacted with the further polyfunctional epoxy compound or reacted with two components of the further polyfunctional epoxy and the polyfunctional isocyanate compound or two components of the further epoxy compound and the carboxylic acid, it is difficult to obtain particles of curing agent satisfying both the curability at low temperatures and the latency. On the other hand, as shown in Examples 8 to 13 in Table 5 and Examples 14 to 19 in Table 6 it is possible to improve the latency of the particles of curing agent to a great extent while the curability at low temperatures is maintained when the particles of the adducts independent of their preparation method are reacted with the three components of the excess polyfunctional epoxy compound, the carboxylic acid and the polyfunctional isocyanate compound as the essential components. The epoxy resin curing compositions added with the particles of curing agent prepared in accordance with the present invention minimally increase their viscosity when stored at 40° C. for one week and accordingly have considerably good storage stability. Furthermore, by regulating the amounts of the excess polyfunctional epoxy compound, the carboxylic compound and the polyfunctional isocyanate compound, it is possible to further improve the storage stability and the quick curability at low temperature of the epoxy resin curing compositions. This is seen in Example 9, 10, 15 to 17 and 19. These curing agents can cure the epoxy resin containing them at 80° C. in about 30 minutes and show better curing properties than the original adducts as in Comparative Examples 2, 4 and 5.

The physical properties of the cured products prepared from various epoxy resin curing compositions are shown in Tables 5 and 6. The water absorptions of these Examples and Comparative Examples were almost the same and are at a low level. On the other hand, the glass transition temperatures (Tg) of the Examples were higher than those of the Comparative Examples. Furthermore, the bonding strengths of the Examples were equal to or higher than those of the Comparative Examples, and the tensile shear bonding strengths of a considerably high level could be exhibited by heating at a low temperature of 80° C. for 60 minutes.

Regarding the reaction mode for the preparation of the particles of curing agent, it would be understood by comparing Example 8 in Table 5 with Example 14 in Table 6 and comparing Example 11 in Table 5 with Example 19 that the epoxy resin curing compositions using the particles of the adducts directly obtained by the precipitation or dispersion addition reaction are lower in viscosity and better in curability at low temperatures and storage stability than those used the particles of the adduct obtained by the solution or bulk addition reaction and the consecutive crush, pulverization and classification.

The effects of the addition time of each of the components for the particles of curing agent are compared as below.

The excess amount of the polyfunctional epoxy compound may be added at the beginning of the reaction for preparing the amine compound/epoxy compound adduct i.e., in the one-step process or during the reaction or after completion of the reaction, i.e., in the two-step process. The reactivity at low temperatures and the storage stability of the particles of curing agent obtained in the two-step process is higher than that of the particles of curing agent obtained in the one-step process as would be observed by comparing Example 15 with Example 16 in Table 6.

The carboxylic acid may be added before the reaction for forming the adduct or after completion of the reaction or after the reaction of the adduct with an excess amount of the polyfunctional epoxy compound, i.e., in any step before the reaction with the polyfunctional isocyanate compound. In the case of the pulverized particles of curing agent, the reactivity of the resulting particles of curing agent is higher when the carboxylic acid is immediately added after the reaction for forming the adduct as would be observed, for example, in Example 11 than when the carboxylic acid is added after the crushed, pulverized and classified particles of the adduct is dispersed again in a solvent as would be observed, for example, in Example 9. Also, the addition of the carboxylic acid before the reaction for forming the adduct further increases the reactivity of the resulting particles of curing agent as would be observed, for example, in Example 10. This tendency can be seen with other amine compound/epoxy compound adducts as in Examples 12 and 13 and with the spherical particles of curing agent of the present invention as in Examples 18 and 19. Accordingly, it is necessary to appropriately adjust the amount of the polyfunctional isocyanate compound to avoid the unfavorable decrease in the latency due to higher reactivities of the particles. However, in order to preparing the latent curing agent it is preferred that the reaction with the polyfunctional isocyanate compound is carried out at the final stage, i.e., after completion of all the modification reactions using an excess amount of the polyfunctional epoxy compound and the carboxylic acid.

The properties of the pulverized particles of curing agent and the spherical particles of curing agent as obtained in Examples 8 to 19 as the curing accelerators for the high temperature curing agents are shown in Tables 7 to 10 together with those as obtained in Comparative Examples 1 to 2, 4 to 5 and 8 to 12. As a result, the curing temperature could be lowered to 100° C. The curing properties at 100° C. in the Examples are equal to or better than those in the Comparative Examples. The curing time was such a short period of time as about 15 minutes and the formulated epoxy resin curing compositions hardly increased their viscosity at 40° C. for one week and showed excellent storage stability. Furthermore, the curing accelerators obtained according to the present invention could give comparatively good cured properties compared to those obtained in the Comparative Examples.

The solubilities of the pulverized particles of curing agent as in Example 8, 9 and 12 and the spherical particles of curing agent as in Example 14 to 19 in various solvents are compared to Tables 11 and 12 with those of the particles of the adducts as in Comparative Example 1, 2 and 3 and Comparative Example 4 and 5 which are the starting materials for curing agent. The amine compound/epoxy compound adducts, which are highly polar, are insoluble in hydrophobic solvents but soluble in polar solvents such as alcohols. The spherical particles of the adducts prepared by the precipitation or dispersion addition reaction are insoluble in many organic solvents for general purposes. On the other hand, the pulverized particles of the addition products obtained by the solution addition reaction and the bulk addition reaction and the consecutive crush, pulverization and classification are swollen in most organic solvents although depending on the kind of the amine compounds employed.

The solvent resistances of the spherical or pulverized particles of curing agent according to the present invention are considerably improved. Particularly, a larger amount of the polyfunctional isocyanate compound as in Example 17 renders the particles of the adduct insoluble in all the solvents for general purposes and greatly improves the solvent resistance. This property would be very advantageous for ink, paint and one-component type epoxy resin curing compositions for adhesives which use organic solvents or reactive diluents as the formulation components.

TABLE 1

| | Comparative Example No. | | | | | |
|---|---|---|---|---|---|---|
| | 1 | 2 | 3 | 4 | 5 | 6 |
| Conditions for Preparation and Results: | | | | | | |
| Adduct Components | | | | | | |
| Epoxy Compound | EP 828[1] | DER 332 | DER 332 | EP 828 | DER 332 | DER 332 |
| Amine Compound | 2MZ | 2PZ | EMI-24 | 2MZ | 2PZ | EMI-24 |
| Polyfunctional Epoxy Compound Excess Amount Added (%) | 0 | 0 | 0 | 0 | 0 | 0 |
| Reaction Mode | Pulverization | Pulverization | Pulverization | Precipitation | Precipitation | Precipitation |
| Volume Average Particle Size (μm) | 2.9 | 4.5 | 4.3 | 2.8 | 3.8 | 4.1 |
| External Appearance | Yellow Powder | Yellow Powder | Yellow Powder | White Powder | White Powder | Yellow Powder |
| Epoxy Resin Curing Composition: | | | | | | |
| Dosage (phr) | 10 | 11 | 10 | 10 | 11 | 11 |
| Viscosity (cps/25° C.) | 26,700 | 28,500 | 26,400 | 21,300 | 22,000 | 17,600 |
| Curing Time (minute) 120° C. | 5 | 5 | 5 | 5 | 5 | 5 |
| 100° C. | 10 | 10 | 10 | 10 | 10 | 10 |
| Increase in Viscosity after One Week at 40° C. | Gelled | Gelled | Gelled | 28 | Gelled | Gelled |
| Cured Products[2]: | | | | | | |
| External Appearance | Reddish Brown | Reddish Brown | Reddish Brown | Reddish Brown | Reddish Brown | Reddish Brown |
| Tg (°C.) | 145 | 136 | 145 | 145 | 137 | 145 |

TABLE 1-continued

| | Comparative Example No. | | | | | |
|---|---|---|---|---|---|---|
| | 1 | 2 | 3 | 4 | 5 | 6 |
| Water Absorption (%) | 0.3 | 0.2 | 0.3 | 0.3 | 0.2 | 0.3 |

[1] EPIKOTE ® 828
[2] Curing Conditions: 100° C. × 1 hours + 150° C. × 3 hours

TABLE 2

| | Example No. | | | | | |
|---|---|---|---|---|---|---|
| | 1 | 2 | 3 | 4 | 5 | 6 |
| Conditions for Preparation and Results: | | | | | | |
| Adduct Components | | | | | | |
| Epoxy Compound | EP 828 | EP 828 | EP 828 | EP 828 | DER 332 | DER 332 |
| Amine Compound | 2MZ | 2MZ | 2MZ | 2MZ | 2PZ | EMI-24 |
| Polyfunctional Epoxy Compound | EP828 | EP828 | EP828 | EP828 | EP828 | EP828 |
| Excess Amount Added (%) | 9 | 19 | 33 | 33 | 25 | 31 |
| Reaction Mode | Precipitation One-step | Precipitation One-step | Precipitation One-step | Precipitation Two-step | Precipitation Two-step | Precipitation Two-step |
| Volume Average Particle Size (μm) | 2.8 | 2.9 | 3.0 | 3.0 | 4.1 | 4.4 |
| External Appearance | White Powder | White Powder | White Powder | White Powder | White Powder | Yellow Powder |
| Epoxy Resin Curing Composition: | | | | | | |
| Dosage (phr) | 11 | 12 | 13 | 13 | 14 | 14 |
| Viscosity (cps/25° C.) | 17,000 | 20,100 | 21,000 | 21,800 | 23,000 | 23,300 |
| Curing Time (minute) 120° C. | 5 | 5 | 5 | 5 | 5 | 5 |
| 100° C. | 15 | 15 | 20 | 20 | 15 | 15 |
| Increase in Viscosity after One Week at 40° C. | 11.8 | 4.7 | 1.1 | 1.0 | 1.3 | 2.1 |
| Cured Product[1]: | | | | | | |
| External Appearance | Reddish Brown | Reddish Brown | Reddish Brown | Reddish Brown | Reddish Brown | Reddish Brown |
| Tg (°C.) | 145 | 144 | 143 | 145 | 136 | 144 |
| Water Absorption (%) | 0.3 | 0.3 | 0.3 | 0.3 | 0.2 | 0.3 |

[1] Curing Conditions: 100° C. × 1 hour + 150° C. × 3 hours

TABLE 3

| | Comparative 4 | Example No. 7 | Example No. 7 |
|---|---|---|---|
| Conditions for Preparation and Results: | | | |
| Polyfunctional Epoxy Compound Excess Amount Added (%) | 0 | 0 | 8 |
| Polyfunctional Isocyanate Compound Amount Added (%) | 0 | 6 | 6 |
| Volume Average Particle Size (μm) | 2.8 | 2.9 | 3.0 |
| External Appearance | White Powder | White Powder | White Powder |
| Epoxy Resin Curing Composition: | | | |
| Dosage (phr) | 10 | 11 | 11 |
| Viscosity (cps/25° C.) | 21,300 | 19,900 | 18,900 |
| Curing Time (minute) 120° C. | 5 | 5 | 5 |
| 100° C. | 10 | 15 | 20 |
| Increase in Viscosity after One Week at 40° C. | 28.0 | 1.4 | 1.0 |
| Cured Product[1]: | | | |
| External Appearance | Reddish Brown | Reddish Brown | Reddish Brown |
| Tg (°C.) | 145 | 145 | 144 |
| Water Absorption (%) | 0.3 | 0.3 | 0.3 |

[1] Curing Conditions: 100° C. × 1 hour + 150° C. × 3 hours

TABLE 4

| | Formulation No. | | | | | | | | |
|---|---|---|---|---|---|---|---|---|---|
| | 1 | 2 | 3 | 4 | 5 | 6 | 7 | 8 | 9 |
| Formulation (part by weight): | | | | | | | | | |
| EPIKOTE ® 828 | 100 | 100 | 100 | 100 | 100 | 100 | 100 | 100 | 100 |
| Dicy[1] | 8 | 8 | 8 | 8 | 8 | 8 | 8 | — | — |
| MHHPA[2] | — | — | — | — | — | — | — | 85 | 85 |
| Curing Accelerator: | | | | | | | | | |
| Comparative Example 4 | 5.0 | — | — | — | — | — | — | 5.0 | — |
| Comparative Example 5 | — | 5.5 | — | — | — | — | — | — | 5.5 |
| Comparative Example 6 | — | — | 5.5 | — | — | — | — | — | — |
| Example 3 | — | — | — | 6.5 | — | — | — | — | — |
| Example 4 | — | — | — | — | 6.5 | — | — | — | — |
| Example 5 | — | — | — | — | — | 7.0 | — | — | — |
| Example 6 | — | — | — | — | — | — | 7.0 | — | — |
| Curing Composition: | | | | | | | | | |
| Viscosity (cps/25° C.) | 24,200 | 23,500 | 23,300 | 24,000 | 24,500 | 24,700 | 24,800 | 920 | 930 |
| Curing Time (minute) | | | | | | | | | |
| 120° C. | 5 | 5 | 5 | 5 | 5 | 5 | 5 | 5 | 5 |

TABLE 4-continued

|  | | | | | | | | | |
|---|---|---|---|---|---|---|---|---|---|
| 100° C. | 20 | 20 | 20 | 20 | 20 | 20 | 20 | 15 | 15 |
| Increase in Viscosity after One Week at 40° C. | 376 | Gelled | Gelled | 1.1 | 1.1 | 1.2 | 1.7 | Gelled | Gelled |
| Cured Product[3]: | | | | | | | | | |
| External Appearance | White translucent | White translucent | White translucent | White translucent | White translucent | White translucent | White translucent | Colorless Clear | Colorless Clear |
| Tg (°C.) | 147 | 145 | 146 | 148 | 148 | 145 | 149 | 148 | 147 |
| Water Absorption (%) | 0.5 | 0.5 | 0.5 | 0.5 | 0.5 | 0.5 | 0.5 | 0.2 | 0.2 |

| | Formulation No. | | | | | | | | |
|---|---|---|---|---|---|---|---|---|---|
| | 10 | 11 | 12 | 13 | 14 | 15 | 16 | 17 | 18 |
| Formulation (part by weight): | | | | | | | | | |
| EPIKOTE ® 828 | 100 | 100 | 100 | 100 | 100 | 100 | 100 | 100 | 100 |
| Dicy[1] | — | — | — | — | — | 8 | 8 | — | — |
| MHHPA[2] | 85 | 85 | 85 | 85 | 85 | — | — | 85 | 85 |
| Curing Promotor: | | | | | | | | | |
| Comparate Example 6 | 5.5 | — | — | — | — | — | — | — | — |
| Example 3 | — | 6.5 | — | — | — | — | — | — | — |
| Example 4 | — | — | 6.5 | — | — | — | — | — | — |
| Example 5 | — | — | — | 7.0 | — | — | — | — | — |
| Example 6 | — | — | — | — | 7.0 | — | — | — | — |
| Comparative Example 7 | — | — | — | — | — | 5.3 | — | 5.3 | — |
| Example 7 | — | — | — | — | — | — | 5.7 | — | 5.7 |
| Curing Composition: | | | | | | | | | |
| Viscosity (cps/25° C.) | 920 | 910 | 880 | 940 | 930 | 23,500 | 23,200 | 910 | 900 |
| Curing Time (minute) | | | | | | | | | |
| 120° C. | 5 | 5 | 5 | 5 | 5 | 5 | 5 | 5 | 5 |
| 100° C. | 15 | 15 | 15 | 15 | 15 | 20 | 20 | 15 | 15 |
| Increase in Viscosity after One Week at 40° C. | Gelled | 2.2 | 2.4 | 3.0 | 5.1 | 1.3 | 1.1 | 2.6 | 2.3 |
| Cured Product[2]: | | | | | | | | | |
| External Appearance | Colorless Clear | Colorless Clear | Colorless Clear | Colorless Clear | Colorless Clear | White translucent | White translucent | Colorless Clear | Colorless Clear |
| Tg (°C.) | 148 | 147 | 148 | 146 | 148 | 148 | 146 | 147 | 148 |
| Water Absorption (%) | 0.2 | 0.2 | 0.2 | 0.2 | 0.2 | 0.5 | 0.5 | 0.2 | 0.2 |

[1]Dicy: Dicyandiamide, [2]MHHPA: Methylhexahydrophthalic anhydride. When used alone, the increase in viscosity after one week at 40° C. was nearly doubled.
[3]Curing Condition: 100° C. × 1 hour + 150° C. × 3 hours

TABLE 5

| | Comparative Example No. | | | | |
|---|---|---|---|---|---|
| | 1 | 2 | 8 | 9 | 10 |
| Conditions for Preparation & Results | | | | | |
| Adduct Components | | | | | |
| Epoxy Compound | EP 828[1] | DER 332 | DER 332 | DER 332 | DER 332 |
| Amine Compound | 2MZ | 2PZ | 2PZ | EMI-24 | EMI-24 |
| Components and Amount Added (%) | | | | | |
| Epoxy Resin[2] | — | — | — | 31 (one step process) | 31 (one step process) |
| Carboxylic Acid[3] | — | — | 14 (added before synthesis) | — | 20 (added after synthesis) |
| Polyfunctional Isocyanate Compound[4] | — | — | — | — | — |
| Volume Average Particle Size (μm) | 2.9 | 4.5 | 5.2 | 5.4 | 5.8 |
| External Appearance | Yellow Powder | Yellow Powder | Yellow Powder | Yellow Powder | Yellow Powder |
| Curing Composition | | | | | |
| Dosage (phr) | 10 | 11 | 13 | 13 | 15 |
| Viscosity (cps/25° C.) | 26,700 | 28,500 | 34,000 | 28,000 | 33,500 |
| Curing Time (minute) | | | | | |
| 120° C. | 5 | 5 | 5 | 5 | 5 |
| 100° C. | 10 | 10 | 10 | 10 | 10 |
| 80° C. | 30 | 35 | 15 | 45 | 20 |
| Increase in Viscosity after One Week at 40° C. | Gelled | Gelled | Gelled | Gelled | Gelled |
| Cured Product[5] | | | | | |
| External Appearance | Reddish Brown | Reddish Brown | Reddish Brown | Reddish Brown | Reddish Brown |
| Tg (°C.) | 145 | 136 | 138 | 143 | 146 |
| Water Absorption (%) | 0.3 | 0.2 | 0.2 | 0.3 | 0.3 |
| Bonding Strength[6] (kgf/cm²) | 110 | 106 | 104 | 111 | 110 |

TABLE 5-continued

| | Example No. | | | | | |
|---|---|---|---|---|---|---|
| | 8 | 9 | 10 | 11 | 12 | 13 |
| Conditions for Preparation & Results | | | | | | |
| Adduct Components | | | | | | |
| Epoxy Compound | EP 828[1] | DER 332 | DER 332 | DER 332 | DER 332 | DER 332 |
| Amine Compound | 2MZ | 2PZ | 2PZ | 2PZ | EMI-24 | EMI-24 |
| Components and Amount Added (%) | | | | | | |
| Epoxy Resin[2] | 33 (two-step process) | 25 (two-step process) | 25 (two-step process) | 25 (two-step process) | 31 (one-step process) | 31 (one-step process) |
| Carboxylic Acid[3] | 14 | 14 (added after dispersion) | 14 (added before synthesis) | 14 (added after synthesis) | 20 (added after synthesis) | 20 (added after dispersion) |
| Polyfunctional Isocyanate Compound[3] | 10 | 11 | 11 | 11 | 10 | 10 |
| Volume Average Particle Size (μm) | 3.2 | 4.9 | 5.4 | 4.8 | 5.5 | 5.8 |
| External Appearance | Yellow Powder | Yellow Powder | Yellow Powder | Yellow Powder | Yellow Powder | Yellow Powder |
| Curing Composition | | | | | | |
| Dosage (phr) | 15 | 17 | 17 | 17 | 20 | 20 |
| Viscosity (cps/25° C.) | 32,000 | 34,000 | 33,000 | 33,700 | 35,200 | 36,000 |
| Curing time (minute) | | | | | | |
| 120° C. | 5 | 5 | 5 | 5 | 5 | 5 |
| 100° C. | 10 | 10 | 10 | 10 | 10 | 10 |
| 80° C. | 40 | 35 | 30 | 35 | 40 | 40 |
| Increase in Vicosity after One week at 40° C. | 1.5 | 1.2 | 1.4 | 1.3 | 1.4 | 1.3 |
| Cured Product[5] | | | | | | |
| External Appearance | Reddish Brown | Reddish Brown | Reddish Brown | Reddish Brown | Reddish Brown | Reddish Brown |
| Tg (°C.) | 151 | 140 | 141 | 142 | 149 | 150 |
| Water Absorption (%) | 0.3 | 0.2 | 0.2 | 0.2 | 0.3 | 0.3 |
| Bonding Strength[6] (kgf/cm$^2$) | 113 | 108 | 109 | 112 | 110 | 113 |

[1]EPIKOTE ® 828, [2]EPIKOTE ® 828 for Example Nos. 8, 9, 10 and 11; DER 332 for Nos. 12 and 13.
[3]2-Ethylhexanoic acid, [4]diphenlmethane-4,4'-diisocyanate
[5]Curing Conditions: 100° C. × 1 hour + 150° C. × 3 hours
[6]Procedure in accordance with JIS K-6850 was followed to test the tensile shear bonding strength with aluminum plates. Curing condition: 80° C. × 60 minutes.

TABLE 6

| | Comparative Example No. | | | | Example No. | |
|---|---|---|---|---|---|---|
| | 4 | 5 | 11 | 12 | 4 | 5 |
| Conditions for Preparation & Results | | | | | | |
| Adduct Components | | | | | | |
| Epoxy Compound | EP 828[1] | DER 332 | EP 828 | DER 332 | EP 828 | DER 332 |
| Amine Compound | 2MZ | 2PZ | 2MZ | 2PZ | 2MZ | 2PZ |
| Components and Amount Added (%) | | | | | | |
| Epoxy Resin[2] | — | — | 33 (2-step process) | 25 (2-step process) | 33 (2-step process) | 25 (2-step process) |
| Carboxylic Acid: Q[3] | — | — | 14 | — | — | — |
| R[4] | — | — | — | 14 (added before synthesis) | — | — |
| Polyfunctional Isocyanate Compound: X[5] | — | — | — | — | — | — |
| Y[6] | — | — | — | — | — | — |
| Z[7] | — | — | — | — | — | — |
| Volume Average Particle Size (μm) | 2.8 | 3.8 | 3.0 | 4.2 | 3.0 | 4.1 |
| External Appearance | White Powder | White Powder | White Powder | White Powder | White Powder | White Powder |
| Curing Composition | | | | | | |
| Dosage (phr) | 10 | 11 | 14 | 15 | 13 | 14 |
| Viscosity (cps/25° C.) | 21,300 | 22,000 | 18,800 | 23,400 | 21,800 | 23,000 |
| Curing Time (minute) | | | | | | |
| 120° C. | 5 | 5 | 5 | 5 | 5 | 5 |
| 100° C. | 10 | 10 | 10 | 10 | 20 | 15 |
| 80° C. | 40 | 30 | 40 | 20 | >60 | >60 |
| Increase in Viscosity after One Week at 40° C. | 28 | Gelled | Gelled | Gelled | 1.0 | 1.3 |
| Cured Product[8] | | | | | | |
| External Appearance | Reddish Brown | Reddish Brown | Reddish Brown | Reddish Brown | Reddish Brown | Reddish Brown |

TABLE 6-continued

| | | | | | | |
|---|---|---|---|---|---|---|
| Tg (°C.) | 145 | 137 | 150 | 138 | 145 | 136 |
| Water Absorption (%) | 0.3 | 0.2 | 0.3 | 0.2 | 0.3 | 0.2 |
| Bonding Strength[9] (kgf/cm$^2$) | 110 | 106 | 112 | 110 | — | — |

| | Example No. | | | | | |
|---|---|---|---|---|---|---|
| | 14 | 15 | 16 | 17 | 18 | 19 |
| Conditions for Preparation & Results | | | | | | |
| Adduct Components | | | | | | |
| Epoxy Compound | EP 828[1] | EP 828 | EP 828 | EP 828 | DER 332 | DER 332 |
| Amine Compound | 2MZ | 2MZ | 2MZ | 2MZ | 2PZ | 2PZ |
| Components and Amount Added (%) | | | | | | |
| Epoxy Resin[2] | 33 (2-step process) | 33 (2-step process) | 33 (1-step process) | 33 (2-step process) | 25 (2-step process) | 25 (2-step process) |
| Carboxylic Acid: Q[3] | 14 | 28 | 28 | 55 | — | — |
| R[4] | — | — | — | — | 14 (added before synthesis) | 14 (added after sythesis) |
| Polyfunctional Isocyanate Compound: X[5] | 8 | 11 | 11 | — | — | — |
| Y[6] | — | — | — | 14 | — | — |
| Z[7] | — | — | — | — | 10 | 10 |
| Volume Average Particle Size (μm) | 3.1 | 3.2 | 3.2 | 3.3 | 4.3 | 4.3 |
| External Appearance | White Powder | White Powder | White Powder | White Powder | White Powder | White Powder |
| Curing Composition | | | | | | |
| Dosage (phr) | 15 | 17 | 17 | 20 | 16 | 16 |
| Viscosity (cps/25° C.) | 19,200 | 18,200 | 20,200 | 19,700 | 24,000 | 23,900 |
| Curing Time (minute) | | | | | | |
| 120° C. | 5 | 5 | 5 | 5 | 5 | 5 |
| 100° C. | 10 | 10 | 10 | 10 | 10 | 10 |
| 80° C. | 40 | 30 | 35 | 25 | 25 | 25 |
| Increase in Viscosity after One Week at 40° C. | 1.1 | 1.0 | 1.2 | 1.1 | 1.6 | 1.1 |
| Cured Product[8] | | | | | | |
| External Apperance | Reddish Brown | Reddish Brown | Reddish Brown | Reddish Brown | Reddish Brown | Reddish Brown |
| Tg (°C.) | 152 | 155 | 153 | 157 | 139 | 140 |
| Water Absorption (%) | 0.3 | 0.3 | 0.3 | 0.3 | 0.2 | 0.2 |
| Bonding Strength [9] (kgf/cm$^2$) | 113 | 123 | 120 | 127 | 111 | 112 |

[1]EPIKOTE ® 828, [2]EPIKOTE ® 828, [3]2-Ethylhexanoic acid, [4]Isobutyric acid,
[5]Diphenylmethane-4,4'-diisocyanate, [6]Polymethlene polyphenylisocyanate
[7]A mixture of 2,6-tolylene diisocyanate and 2,4-tolylene diisocyanate at a mole ratio of 5:95, [8]Curing Conditions: 100° C. × 1 hour + 150° C. × 3 hours,
[9]Procedure in accordance with JIS K-6850 was followed to test the tensile shear bonding strength with aluminum plates. Curing condition: 80° C. × 60minutes.

TABLE 7

| | Formulation No. | | | | | | | | | | |
|---|---|---|---|---|---|---|---|---|---|---|---|
| | 19 | 20 | 21 | 22 | 23 | 24 | 25 | 26 | 27 | 28 | 29 |
| Formulation (part by weight): | | | | | | | | | | | |
| EPIKOTE ® 828 | 100 | 100 | 100 | 100 | 100 | 100 | 100 | 100 | 100 | 100 | |
| Dicy[1] | 8 | 8 | 8 | 8 | 8 | 8 | 8 | 8 | 8 | 8 | |
| Curing Accelator: | | | | | | | | | | | |
| Comparative Example 1 | 5.0 | — | — | — | — | — | — | — | — | — | — |
| Comparative Example 2 | — | 5.5 | — | — | — | — | — | — | — | — | — |
| Comparative Example 8 | — | — | 6.5 | — | — | — | — | — | — | — | — |
| Comparative Example 9 | — | — | — | 6.5 | — | — | — | — | — | — | — |
| Comparative Example 10 | — | — | — | — | 7.5 | — | — | — | — | — | — |
| Example 8 | — | — | — | — | — | 7.5 | — | — | — | — | — |
| Example 9 | — | — | — | — | — | — | 8.5 | — | — | — | — |
| Example 10 | — | — | — | — | — | — | — | 8.5 | — | — | — |
| Example 11 | — | — | — | — | — | — | — | — | 8.5 | — | — |
| Example 12 | — | — | — | — | — | — | — | — | — | 10.0 | — |
| Example 13 | — | — | — | — | — | — | — | — | — | — | 10.0 |
| Curing | | | | | | | | | | | |

TABLE 7-continued

| | Formulation No. | | | | | | | | | | |
|---|---|---|---|---|---|---|---|---|---|---|---|
| | 19 | 20 | 21 | 22 | 23 | 24 | 25 | 26 | 27 | 28 | 29 |
| Composition: | | | | | | | | | | | |
| Viscosity (cps/25° C.) | 29,300 | 28,200 | 28,500 | 27,300 | 29,500 | 31,000 | 30,500 | 30,800 | 31,200 | 33,400 | 33,100 |
| Curing Time (minute) | | | | | | | | | | | |
| 120° C. | 5 | 5 | 5 | 5 | 5 | 5 | 5 | 5 | 5 | 5 | 5 |
| 100° C. | 20 | 20 | 15 | 20 | 15 | 15 | 15 | 15 | 15 | 15 | 15 |
| Increase in Viscosity after One Week at 40° C. | Gelled | Gelled | Gelled | Gelled | Gelled | 1.2 | 1.1 | 1.2 | 1.2 | 1.4 | 1.2 |
| Cured Product[2]: | | | | | | | | | | | |
| External Appearance | White translucent | White translucent | White translucent | White translucent | White translucent | White translucent | White translucent | White translucent | White translucent | White translucent | White translucent |
| Tg (°C.) | 149 | 147 | 150 | 152 | 154 | 154 | 53 | 152 | 154 | 154 | 156 |
| Water Absorption (%) | 0.5 | 0.5 | 0.5 | 0.5 | 0.5 | 0.5 | 0.5 | 0.5 | 0.5 | 0.5 | 0.5 |

[1] Dicy: Dicyandiamide
[2] Curing Conditions: 100° C. × 1 hour + 150° C. × 3 hours

TABLE 8

| | Formulation No. | | | | | | | | | |
|---|---|---|---|---|---|---|---|---|---|---|
| | 1 | 2 | 30 | 31 | 32 | 33 | 34 | 35 | 36 | 37 |
| Formulation (part by weight): | | | | | | | | | | |
| EPIKOTE ® 828 | 100 | 100 | 100 | 100 | 100 | 100 | 100 | 100 | 100 | — |
| Dicy[1] | 8 | 8 | 8 | 8 | 8 | 8 | 8 | 8 | 8 | — |
| Curing Accelerator: | | | | | | | | | | |
| Comparative Example 4 | 5.0 | — | — | — | — | — | — | — | — | — |
| Comparative Example 5 | — | 5.5 | — | — | — | — | — | — | — | — |
| Comparative Example 11 | — | — | 7.0 | — | — | — | — | — | — | — |
| Comparative Example 12 | — | — | — | 7.5 | — | — | — | — | — | — |
| Example 14 | — | — | — | — | 7.5 | — | — | — | — | — |
| Example 15 | — | — | — | — | — | 8.5 | — | — | — | — |
| Example 16 | — | — | — | — | — | — | 8.5 | — | — | — |
| Example 17 | — | — | — | — | — | — | — | 10.0 | — | — |
| Example 18 | — | — | — | — | — | — | — | — | 8.0 | — |
| Example 19 | — | — | — | — | — | — | — | — | — | 8.0 |
| Curing Composition: | | | | | | | | | | |
| Viscosity (cps/25° C.) | 24,200 | 23,500 | 23,400 | 24,400 | 24,100 | 23,200 | 23,100 | 24,600 | 23,000 | 23,200 |
| Curing Time (minute) | | | | | | | | | | |
| 120° C. | 5 | 5 | 5 | 5 | 5 | 5 | 5 | 5 | 5 | 5 |
| 100° C. | 20 | 20 | 15 | 15 | 15 | 15 | 15 | 15 | 15 | 15 |
| Increase in viscosity after One Week at 40° C. | 276 | Gelled | Gelled | Gelled | 1.1 | 1.2 | 1.2 | 1.1 | 1.2 | 1.1 |
| Cured Product[2]: | | | | | | | | | | |
| External Appearance | White translucent | White translucent | White translucent | White translucent | White translucent | White translucent | White translucent | White translucent | White translucent | White translucent |
| Tg (°C.) | 147 | 145 | 154 | 150 | 153 | 156 | 155 | 157 | 151 | 150 |
| Water Absorption (%) | 0.5 | 0.5 | 0.5 | 0.5 | 0.5 | 0.5 | 0.5 | 0.5 | 0.5 | 0.5 |

[1] Dicy: Dicyandiamide.
[2] Curing Conditions: 100° C. × 1 hr + 150° C. × 3 hrs.

TABLE 9

| | Formulation No. | | | | | | | | | | |
|---|---|---|---|---|---|---|---|---|---|---|---|
| | 38 | 39 | 40 | 41 | 42 | 43 | 44 | 45 | 46 | 47 | 48 |
| Formulation (part by weight): | | | | | | | | | | | |
| EPIKOTE ® 828 | 100 | 100 | 100 | 100 | 100 | 100 | 100 | 100 | 100 | 100 | 100 |
| MHHPA[1] | 85 | 85 | 85 | 85 | 85 | 85 | 85 | 85 | 85 | 85 | 85 |
| Curing Accelerator: | | | | | | | | | | | |
| Comparative Example 1 | 5.0 | — | — | — | — | — | — | — | — | — | — |
| Comparative Example 2 | — | 5.5 | — | — | — | — | — | — | — | — | — |
| Comparative | — | — | 6.5 | — | — | — | — | — | — | — | — |

TABLE 9-continued

| | Formulation No. | | | | | | | | | | |
|---|---|---|---|---|---|---|---|---|---|---|---|
| | 38 | 39 | 40 | 41 | 42 | 43 | 44 | 45 | 46 | 47 | 48 |
| Example 8 Comparative Example 9 | — | — | — | 6.5 | — | — | — | — | — | — | — |
| Comparative Example 10 | — | — | — | — | 7.5 | — | — | — | — | — | — |
| Example 8 | — | — | — | — | — | 7.5 | — | — | — | — | — |
| Example 9 | — | — | — | — | — | — | 8.5 | — | — | — | — |
| Example 10 | — | — | — | — | — | — | — | 8.5 | — | — | — |
| Example 11 | — | — | — | — | — | — | — | — | 8.5 | — | — |
| Example 12 | — | — | — | — | — | — | — | — | — | 10.0 | — |
| Example 13 | — | — | — | — | — | — | — | — | — | — | 10.0 |
| Curing Composition | | | | | | | | | | | |
| Viscosity (cps/25° C.) | 960 | 980 | 990 | 985 | 995 | 980 | 1050 | 1020 | 1040 | 1100 | 1120 |
| Curing Time (minute) | | | | | | | | | | | |
| 120° C. | 5 | 5 | 5 | 5 | 5 | 5 | 5 | 5 | 5 | 5 | 5 |
| 100° C. | 15 | 15 | 15 | 15 | 15 | 15 | 15 | 15 | 15 | 15 | 15 |
| Increase in Viscosity after One Week at 40° C. | Gelled | Gelled | Gelled | Gelled | Gelled | 2.3 | 2.5 | 2.4 | 2.5 | 2.7 | 2.9 |
| Cured Product[2]: | | | | | | | | | | | |
| External Appearance | Colorless Clear | Colorless Clear | Colorless Clear | Colorless Clear | Colorless Clear | Colorless Clear | Colorless Clear | Colorless Clear | Colorless Clear | Colorless Clear | Colorless Clear |
| Tg (°C.) | 148 | 147 | 150 | 152 | 153 | 151 | 153 | 152 | 154 | 155 | 154 |
| Water Absorption (%) | 0.2 | 0.2 | 0.2 | 0.2 | 0.2 | 0.2 | 0.2 | 0.2 | 0.2 | 0.2 | 0.2 |

[1]MHHPA: Methylhexahydrophthalic anhydride. When used alone, the increase in viscosity after 1 week at 40° C. was nearly doubled.
[2]Curing Conditions: 100° C. × 1 hour + 150° C. × 3 hours

TABLE 10

| | Formulation No. | | | | | | | | | |
|---|---|---|---|---|---|---|---|---|---|---|
| | 8 | 9 | 49 | 50 | 51 | 52 | 53 | 54 | 55 | 56 |
| Formulation (part by weight): | | | | | | | | | | |
| EPIKOTE ® 828 | 100 | 100 | 100 | 100 | 100 | 100 | 100 | 100 | 100 | 100 |
| MHHPA[1] | 85 | 85 | 85 | 85 | 85 | 85 | 85 | 85 | 85 | 85 |
| Curing Accelerator: | | | | | | | | | | |
| Comparative Example 4 | 5.0 | — | — | — | — | — | — | — | — | — |
| Comparative Example 5 | — | 5.5 | — | — | — | — | — | — | — | — |
| Comparative Example 11 | — | — | 7.0 | — | — | — | — | — | — | — |
| Comparative Example 12 | — | — | — | 7.5 | — | — | — | — | — | — |
| Example 14 | — | — | — | — | 7.5 | — | — | — | — | — |
| Example 15 | — | — | — | — | — | 8.5 | — | — | — | — |
| Example 16 | — | — | — | — | — | — | 8.5 | — | — | — |
| Example 17 | — | — | — | — | — | — | — | 10.0 | — | — |
| Example 18 | — | — | — | — | — | — | — | — | 8.0 | — |
| Example 19 | — | — | — | — | — | — | — | — | — | 8.0 |
| Curing Composition: | | | | | | | | | | |
| Viscosity (cps/25° C.) | 920 | 930 | 910 | 920 | 930 | 850 | 880 | 950 | 870 | 890 |
| Curing Time (minute) | | | | | | | | | | |
| 120° C. | 5 | 5 | 5 | 5 | 5 | 5 | 5 | 5 | 5 | 5 |
| 100° C. | 15 | 15 | 15 | 15 | 15 | 15 | 15 | 15 | 15 | 15 |
| Increase in Viscosity after One Week at 40° C. | Gelled | Gelled | Gelled | Gelled | 2.3 | 2.5 | 2.6 | 2.4 | 3.2 | 2.8 |
| Cured Product[2]: | | | | | | | | | | |
| External Appearance | Colorless Clear | Colorless Clear | Colorless Clear | Colorless Clear | Colorless Clear | Colorless Clear | Colorless Clear | Colorless Clear | Colorless Clear | Colorless Clear |
| Tg (°C.) | 148 | 147 | 152 | 150 | 151 | 154 | 153 | 156 | 152 | 154 |
| Water Absorption | 0.2 | 0.2 | 0.2 | 0.2 | 0.2 | 0.2 | 0.2 | 0.2 | 0.2 | 0.2 |

[1]MHHPA: Methylhexahydrophthalic anhydride. When used alone, the increase in viscosity after 1 week at 40° C. was nearly doubled.
[2]Curing Condition: 100° C. × 1 hour + 150° C. × 3 hours

TABLE 11

| Solvent | Comparative Example No. 1 | 2 | 3 | Example No. 8 | 9 | 12 |
|---|---|---|---|---|---|---|
| n-Hexane | C | C | C | C | C | C |
| n-Octane | C | C | C | C | C | C |
| Cyclohexane | C | C | C | C | C | C |
| Methyl isobutyl ketone | C | C | B | C | C | C |
| n-Butyl acetate | C | C | B | C | C | C |
| p-Xylene | C | B | B | C | C | C |
| Toluene | B | B | B | C | C | C |
| Tetrahydrofuran | B | B | A | C | C | C |
| Benzene | B | B | B | C | C | C |
| N-Butylcellosolve acetate | B | B | B | C | C | C |
| Methyl ethyl ketone | B | B | B | C | C | C |
| Ethyl acetate | B | B | B | C | C | C |
| Acetone | B | B | B | C | C | C |
| Dioxane | B | B | B | C | C | C |
| Dimethyl formamide | A | A | A | B | B | B |
| n-Butanol | A | A | A | B | B | B |
| Ethanol | A | A | A | B | B | B |
| Methanol | A | A | A | B | B | B |
| Water | B | C | C | C | C | C |

A: Soluble; B: Swollen; C: Insoluble

TABLE 12

| Solvent | Comparative Example No. 4 | 5 | Example No. 14 | 15 | 16 | 17 | 18 | 19 |
|---|---|---|---|---|---|---|---|---|
| n-Hexane | C | C | C | C | C | C | C | C |
| n-Octane | C | C | C | C | C | C | C | C |
| Cyclohexane | C | C | C | C | C | C | C | C |
| Methyl isobutyl ketone | C | C | C | C | C | C | C | C |
| n-Butyl acetate | C | C | C | C | C | C | C | C |
| p-Xylene | C | C | C | C | C | C | C | C |
| Toluene | C | C | C | C | C | C | C | C |
| Tetrahydrofuran | C | C | C | C | C | C | C | C |
| Benzene | C | C | C | C | C | C | C | C |
| N-Butylcellosolve acetate | C | C | C | C | C | C | C | C |
| Methyl ethyl ketone | C | C | C | C | C | C | C | C |
| Ethyl acetate | C | C | C | C | C | C | C | C |
| Acetone | C | C | C | C | C | C | C | C |
| Dioxane | C | C | C | C | C | C | C | C |
| Dimethyl formamide | B | A | C | C | C | C | C | C |
| n-Butanol | A | A | C | C | C | C | C | C |
| Ethanol | A | A | C | C | C | C | C | C |
| Methanol | A | A | B | B | B | C | B | B |
| Water | C | C | C | C | C | C | C | C |

A: Soluble; B: Swollen; C: Insoluble

What is claimed:

1. A method for the preparation of fine powder of a latent curing agent for epoxy resin which comprises the steps of:
   (a) substantially stoichiometrically reacting an amine compound having only one active amino-hydrogen with a polyfunctional epoxy compound in the presence of a dispersion stabilizer in an organic solvent capable of dissolving both said amine compound and said epoxy compound but incapable of dissolving the amine compound/epoxy compound adduct formed therefrom at elevated temperatures with agitation to form spherical particles of said amine compound/epoxy compound adduct;
   (b) reacting said particles with a polyfunctional epoxy compound in the presence of said dispersion stabilizer in said organic solvent at elevated temperatures with agitation; and
   (c) recovering the particles thus formed from the reaction mixture.

2. The method of claim 1 further comprising the step (d) of reacting the particles formed in step (b) with a polyfunctional isocyanate compound in an organic reaction medium at elevated temperatures with agitation before step (c).

3. The method of claim 1 still further comprising the step (e) of either
   (1) adding a carboxylic acid before the stoichiometric reaction of said amine compound with said epoxy compound in step (a),
   (2) reacting said particles formed in step (a) with a carboxylic acid before step (b), or
   (3) reacting said particles formed in step (b) with a carboxylic acid before step (d).

4. A method for the preparation of fine powder of a latent curing agent for epoxy resin which comprises the steps of:
   (a) reacting an amine compound having only one active amino-hydrogen with a polyfunctional epoxy compound in excess amount relative to the amount of said amine compound in the presence of a dispersion stabilizer in an organic solvent capable of dissolving both said amine compound and said polyfunctional epoxy compound but incapable of dissolving the amine compound/epoxy compound adduct formed therefrom at elevated temperatures with agitation to form spherical particles of said amine compound/epoxy compound adduct; and
   (b) recovering said particles from the reaction mixture.

5. The method of claim 4 further comprising the step (c) of reacting the particles formed in step (a) with a polyfunctional isocyanate compound in an organic reaction medium at elevated temperatures with agitation before step (b).

6. The method of claim 4 still further comprising the step (d) of either
   (1) adding a carboxylic acid before the reaction of said amine compound with said polyfunctional epoxy compound in step (a) or
   (2) reacting said particles formed in step (a) with a carboxylic acid before step (c).

* * * * *